United States Patent
Saito

(10) Patent No.: US 12,124,023 B2
(45) Date of Patent: Oct. 22, 2024

(54) EYEPIECE LENS, OBSERVATION OPTICAL SYSTEM, AND OPTICAL APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 859 days.

(21) Appl. No.: 17/116,205

(22) Filed: Dec. 9, 2020

(65) Prior Publication Data

US 2021/0199947 A1 Jul. 1, 2021

(30) Foreign Application Priority Data

Dec. 25, 2019 (JP) ................................. 2019-235158

(51) Int. Cl.
*G02B 25/00* (2006.01)
*G02B 9/34* (2006.01)

(52) U.S. Cl.
CPC ............. *G02B 25/001* (2013.01); *G02B 9/34* (2013.01)

(58) Field of Classification Search
CPC ...... G02B 25/001; G02B 9/34; G02B 13/004; G02B 15/144113; G02B 13/04; G02B 25/04
USPC ....... 359/644, 643, 660, 684, 715, 747, 771, 359/774
See application file for complete search history.

(56) References Cited

U.S. PATENT DOCUMENTS

| | | | |
|---|---|---|---|
| 5,546,224 A | 8/1996 | Yokota | |
| 8,947,792 B2 * | 2/2015 | Yamamoto | G02B 9/34 359/774 |
| 9,678,328 B2 * | 6/2017 | Saito | G02B 25/001 |
| 10,514,536 B2 * | 12/2019 | Nishida | G02B 25/007 |
| 2012/0098972 A1 * | 4/2012 | Hansen | G06F 18/22 348/E5.09 |
| 2015/0103411 A1 * | 4/2015 | Katagata | G02B 25/001 359/644 |
| 2017/0357085 A1 | 12/2017 | Nishida et al. | |
| 2019/0331909 A1 | 10/2019 | Hirose | |

FOREIGN PATENT DOCUMENTS

| | | |
|---|---|---|
| JP | S60-057315 A | 4/1985 |
| JP | H05-313073 A | 11/1993 |
| JP | H07-152068 A | 6/1995 |
| JP | H07-234357 A | 9/1995 |
| JP | H108-254660 A | 10/1996 |

(Continued)

OTHER PUBLICATIONS

An Office Action; "Notice of Reasons for Refusal," mailed by the Japanese Patent Office on Sep. 27, 2022, which corresponds to Japanese Patent Application No. 2019-235158 and is related to U.S. Appl. No. 17/116,205; with English language translation.

*Primary Examiner* — Stephone B Allen
*Assistant Examiner* — Daniel Jeffery Jordan
(74) *Attorney, Agent, or Firm* — Studebaker & Brackett PC

(57) ABSTRACT

The eyepiece lens consists of, in order from an observation object side to an eye point side, a positive first lens, a negative second lens, a positive third lens, and a positive fourth lens. All lenses are single lenses. The second lens has a biconcave shape. An observation object-side surface of the fourth lens has a convex shape. In a case where a refractive index of the third lens with respect to d line is N3, the eyepiece lens satisfies the following conditional expression.

$1.76 < N3 < 2$

16 Claims, 17 Drawing Sheets

EXAMPLE 1

(56) References Cited

FOREIGN PATENT DOCUMENTS

| JP | 2013088632 A | * | 5/2013 |
| JP | 2017-219742 A | | 12/2017 |
| JP | 2021-081640 A | | 5/2021 |
| WO | 2018/105710 A1 | | 6/2018 |

* cited by examiner

EXAMPLE 1

EXAMPLE 2

EXAMPLE 3

EXAMPLE 4

EXAMPLE 4

EXAMPLE 5

EXAMPLE 5

EXAMPLE 5

EYEPIECE LENS, OBSERVATION OPTICAL SYSTEM, AND OPTICAL APPARATUS

CROSS-REFERENCE TO RELATED APPLICATIONS

The present application claims priority under 35 U.S.C. § 119 to Japanese Patent Application No. 2019-235158, filed on Dec. 25, 2019. The above application is hereby expressly incorporated by reference, in its entirety, into the present application.

BACKGROUND OF THE INVENTION

1. Field of the Invention

The present disclosure relates to an eyepiece lens, an observation optical system, and an optical apparatus.

2. Description of the Related Art

Hitherto, as an eyepiece lens or a loupe, lens systems described in JP2013-088632A, JP1985-057315A (JP-S60-057315A), JP1995-234357A (JP-H07-234357A), and JP1996-254660A (JP-H08-254660A) are known.

SUMMARY OF THE INVENTION

In recent years, there is demand for an eyepiece lens that allows observation with a wider view angle while having satisfactory performance.

The present disclosure has been accomplished in consideration of the above circumstances, and an object of the present disclosure is to provide an eyepiece lens, an observation optical system, and an optical apparatus that allow observation with a wider view angle while having satisfactory performance.

An eyepiece lens according to an aspect of the present disclosure consists of, in order from an observation object side to an eye point side, a first lens having a positive refractive power, a second lens having a negative refractive power, a third lens having a positive refractive power, and a fourth lens having a positive refractive power, the first lens, the second lens, the third lens, and the fourth lens are all single lenses, the second lens has a biconcave shape, an observation object-side surface of the fourth lens has a convex shape, and in a case where a refractive index of the third lens with respect to d line is N3, the following conditional expression (1) is satisfied.

$$1.76 < N3 < 2 \tag{1}$$

In the eyepiece lens according to the aspect of the present disclosure, it is preferable that the following conditional expression (1-1) is further satisfied.

$$1.8 < N3 < 1.9 \tag{1-1}$$

In the eyepiece lens according to the aspect of the present disclosure, it is preferable that, in a case where a focal length of the second lens is f2, and a focal length of the fourth lens is f4, the following conditional expression (2) is satisfied. It is more preferable that the following conditional expression (2-1) is satisfied.

$$-0.42 < f2/f4 < -0.2 \tag{2}$$

$$-0.35 < f2/f4 < -0.21 \tag{2-1}$$

In the eyepiece lens according to the aspect of the present disclosure, it is preferable that, in a case where a focal length of the eyepiece lens is f, and a focal length of the first lens is f1, the following conditional expression (3) is satisfied. It is more preferable that the following conditional expression (3-1) is satisfied.

$$1.2 < f/f1 < 3.5 \tag{3}$$

$$1.4 < f/f1 < 2.5 \tag{3-1}$$

In the eyepiece lens according to the aspect of the present disclosure, it is preferable that, in a case where a focal length of the first lens is f1, and a focal length of the fourth lens is f4, the following conditional expression (4) is satisfied. It is more preferable that the following conditional expression (4-1) is satisfied.

$$2.7 < f4/f1 < 8 \tag{4}$$

$$3 < f4/f1 < 5 \tag{4-1}$$

In the eyepiece lens according to the aspect of the present disclosure, it is preferable that, in a case where a radius of curvature of an eye point-side surface of the second lens is R2r, and a radius of curvature of an observation object-side surface of the third lens is R3f, the following conditional expression (5) is satisfied. It is more preferable that the following conditional expression (5-1) is satisfied.

$$-2.1 < (R2r + R3f)/(R2r - R3f) < -0.2 \tag{5}$$

$$-1.75 < (R2r + R3f)/(R2r - R3f) < -0.6 \tag{5-1}$$

In the eyepiece lens according to the aspect of the present disclosure, it is preferable that the first lens has a biconvex shape. In the eyepiece lens according to the aspect of the present disclosure, it is preferable that an eye point-side surface of the third lens has a convex shape. In the eyepiece lens according to the aspect of the present disclosure, it is preferable that the observation object-side surface of the fourth lens has an aspheric surface. In the eyepiece lens according to the aspect of the present disclosure, it is preferable that an eye point-side surface of the second lens has an aspheric surface.

In the eyepiece lens according to the aspect of the present disclosure, it is preferable that diopter adjustment is performed by changing a distance between an observation object and the eyepiece lens in a direction of an optical axis.

An observation optical system according to another aspect of the present disclosure comprises a display element, and the eyepiece lens according to the aspect of the present disclosure. The observation optical system allows observation of an image of the display element through the eyepiece lens. During diopter adjustment, the eyepiece lens remains stationary, and the display element is moved by changing a distance between the display element and the eyepiece lens in a direction of an optical axis.

An observation optical system according to still another aspect of the present disclosure comprises a display element, and a lens group consisting of a plurality of lenses. The observation optical system allows observation of an image of the display element through the lens group. During diopter adjustment, the lens group remains stationary, and the display element is moved by changing a distance between the display element and the lens group in a direction of an optical axis. In a case where a refractive index of at least one lens of the lens group with respect to d line is Nx, the following conditional expression (6) is satisfied.

$$1.76 < Nx < 2 \tag{6}$$

In the observation optical system according to still another aspect of the present disclosure, it is preferable that the following conditional expression (6-1) is further satisfied.

$$1.8 < Nx < 1.9 \qquad (6\text{-}1)$$

In the observation optical system according to still another aspect of the present disclosure, it is preferable that the lens group consists of four lenses, and a lens satisfying the conditional expression (6) is a third lens from a side of the display element among the four lenses.

An optical apparatus according to still another aspect of the present disclosure comprises the eyepiece lens of the present disclosure. An optical apparatus according to still another aspect of the present disclosure comprises the observation optical system of the present disclosure.

In the specification, it should be noted that the terms "consisting of ~" and "consists of ~" mean that not only the above-described components but also lenses substantially having no refractive power, optical elements, such as a stop, a filter, and a cover glass, other than lenses, and a lens flange, a lens barrel, and the like may be included.

In the specification, the term "lens having a positive refractive power" and the term "positive lens" are synonymous. The term "lens having a negative refractive power" and the term "negative lens" are synonymous. The term "single lens" means one uncemented lens. However, a composite aspheric lens (a lens that integrally consists of a spherical lens and a film having an aspheric shape formed on the spherical lens, and functions as one aspheric lens as a whole) is not regarded as a cemented lens, but is treated as one lens. A sign of a refractive power, a radius of curvature, and a surface shape relating to a lens including an aspheric surface are considered in terms of a paraxial region unless otherwise specified. A sign of a radius of curvature of a surface convex toward the observation object side is positive, and a sign of a radius of curvature of a surface convex toward the eye point side is negative.

The term "focal length" used in the conditional expressions means a paraxial focal length. The values used in the conditional expression are values that are obtained with respect to d line. "d line", "C line", and "F line" described in the specification are emission lines, a wavelength of d line is 587.56 nm (nanometer), a wavelength of C line is 656.27 nm (nanometer), and a wavelength of F line is 486.13 nm (nanometer).

According to the aspects of the present disclosure, it is possible to provide an eyepiece lens, an observation optical system, and an optical apparatus that allow observation with a wider view angle while having satisfactory performance.

DESCRIPTION OF THE PREFERRED EMBODIMENTS

Figure 1:
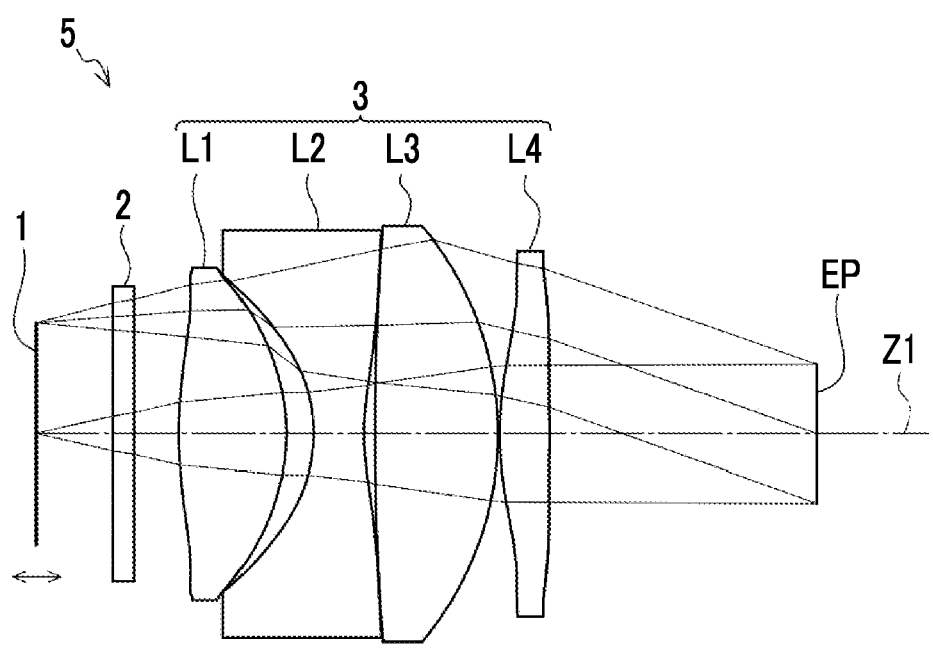
FIG. 1 is a sectional view showing a configuration and luminous fluxes of an eyepiece lens according to an embodiment corresponding to an eyepiece lens of Example 1.

Hereinafter, an embodiment of the present disclosure will be described referring to the drawings. FIG. 1 shows a configuration of an observation optical system 5 according to an embodiment of the present disclosure. An example shown in FIG. 1 corresponds to Example 1 described below, and corresponds to a first embodiment and a second embodiment of the present disclosure described below. In FIG. 1, as an example, a display element 1 is used as an observation object. In FIG. 1, the left side is shown as an observation object side, and the right side is shown as an eye point side. An eye point EP of FIG. 1 does not indicate a shape, but indicates a position in a direction of an optical axis. FIG. 1 also shows an axial luminous flux and a luminous flux with a maximum view angle within a range of the display element 1 to the eye point EP.

First, an observation optical system 5 according to a first embodiment of the present disclosure will be described. The observation optical system 5 comprises a display element 1 and an eyepiece lens 3. The display element 1 is an element that displays an image. As the display element 1, for example, a liquid crystal display element, an organic electroluminescence (EL) display element, or the like can be used. Although the display element actually has a thickness, in FIG. 1, a display surface of the display element 1 is shown as the display element 1 for convenience.

The observation optical system 5 is configured so as to allow observation of an image displayed on the display element 1 through the eyepiece lens 3. FIG. 1 shows an example where a parallel flat plate-shaped optical member 2 having no refractive power is disposed between the display element 1 and the eyepiece lens 3. The optical member 2 is assumed to be protective cover glass, various filters, or the like, and a configuration can also be made in which the optical member 2 is excluded.

The eyepiece lens 3 consists of a plurality of lenses. The eyepiece lens 3 of FIG. 1 consists of, in order from an observation object side to an eye point side, a first lens L1 having a positive refractive power, a second lens L2 having a negative refractive power, a third lens L3 having a positive refractive power, and a fourth lens L4 having a positive refractive power. The four lenses are all uncemented single lenses, and are disposed at air intervals from adjacent lenses on the optical axis. As the eyepiece lens 3 has the above-described configuration, it is advantageous in obtaining a wider view angle.

The eyepiece lens 3 is configured such that, in a case where a refractive index of the third lens L3 with respect to d line is N3, the following conditional expression (1) is satisfied. As a value of the conditional expression (1) is set to be not equal to or less than a lower limit, correction of field curvature is facilitated. As the value of the conditional expression (1) is set to be not equal to or greater than an upper limit, since a material other than a material having a low Abbe number is usable for the third lens L3, correction of chromatic aberration is facilitated. In a case where a configuration is made in which the following conditional expression (1-1) is further satisfied, it is possible to obtain more satisfactory characteristics.

$$1.76 < N3 < 2 \tag{1}$$

$$1.8 < N3 < 1.9 \tag{1-1}$$

Hereinafter, a preferred configuration of the eyepiece lens 3 will be described. It is preferable that the first lens L1 has a biconvex shape. In such a case, it is advantageous in increasing a distance between the display element 1 as the observation object and the eyepiece lens 3. In a configuration in which the distance between the display element 1 and the first lens L1 is changed during diopter adjustment, as the distance between the display element 1 and the eyepiece lens 3 is longer, it becomes easier to secure a space for diopter adjustment. Furthermore, there is an advantage that, as the distance between the display element 1 and the eyepiece lens 3 is longer, dust and scratch on the surface of the display element 1 are more hardly viewed. The first lens L1 may be configured to have at least one aspheric surface in order to allow satisfactory observation with a wider view angle.

It is preferable that the second lens L2 has a biconcave shape. In such a case, it is advantageous in extending eye relief while suppressing field curvature without degrading a view angle. It is preferable that an eye point-side surface of the second lens L2 has an aspheric surface. In such a case, it is advantageous in suppressing the occurrence of lateral chromatic aberration while correcting axial chromatic aberration. In order to obtain more satisfactory characteristics, a configuration may be made in which an observation object-side surface and the eye point-side surface of the second lens L2 have an aspheric surface.

It is preferable that an eye point-side surface of the third lens L3 has a convex shape. In such a case, it is advantageous in correction of spherical aberration. Furthermore, in a case where a configuration is made in which the eye point-side surface of the third lens L3 has a convex shape, and the conditional expression (1) is satisfied, it is possible to increase a correction effect of spherical aberration. The third lens L3 may have a biconvex shape or a meniscus shape convex toward the eye point side.

It is preferable that an observation object-side surface of the fourth lens L4 has a convex shape. In such a case, it is advantageous in obtaining a wide view angle while suppressing astigmatism. For example, a configuration can be made in which the fourth lens L4 has a biconvex shape. It is preferable that the observation object-side surface of the fourth lens L4 has an aspheric surface. In such a case, it is advantageous in correction of coma aberration that occurs in a lens peripheral portion while securing a wide view angle. In order to obtain more satisfactory characteristics, a configuration may be made in which the observation object-side surface and an eye point-side surface of the fourth lens L4 have an aspheric surface.

In the eyepiece lens 3, it is preferable that, in a case where a focal length of the second lens L2 is f2, and a focal length of the fourth lens L4 is f4, the following conditional expression (2) is satisfied. The conditional expression (2) is an expression relating to a suitable range of a ratio of a refractive power of the second lens L2 to a refractive power of the fourth lens L4. As a value of the conditional expression (2) is set to be not equal to or less than a lower limit, since the refractive power of the fourth lens L4 is not excessive with respect to the refractive power of the second lens L2, it is possible to suppress the occurrence of astigmatism. As the value of the conditional expression (2) is set to be not equal to or greater than an upper limit, since the refractive power of the fourth lens L4 is not short with respect to the refractive power of the second lens L2, it is possible to suppress spread of off-axial rays closer to the eye point side than the fourth lens L4 outward in a radial direction, and to suppress the occurrence of coma aberration in a peripheral portion of a visual field. In a case where a configuration is made in which the following conditional expression (2-1) is further satisfied, it is possible to obtain more satisfactory characteristics.

$$-0.42 < f2/f4 < -0.2 \tag{2}$$

$$-0.35 < f2/f4 < -0.21 \tag{2-1}$$

In the eyepiece lens 3, it is preferable that, in a case where a focal length of the eyepiece lens 3 is f, and the focal length of the first lens L1 is f1, the following conditional expression (3) is satisfied. As a value of the conditional expression (3) is set to be not equal to or less than a lower limit, since the refractive power of the first lens L1 is not short, correction of distortion is facilitated. As the value of the conditional expression (3) is set to be not equal to or greater than an upper limit, since the refractive power of the first lens L1 is not excessive, it becomes easy to suppress an increase in angle a principal ray with a maximum view angle emitted from the first lens L1 to the eye point side with respect to an optical axis Z1, and it is advantageous in correction of lateral chromatic aberration. In a case where a configuration is made in which the following conditional expression (3-1) is further satisfied, it is possible to obtain more satisfactory characteristics.

$$1.2 < f/f1 < 3.5 \tag{3}$$

$$1.4 < f/f1 < 2.5 \tag{3-1}$$

In the eyepiece lens 3, it is preferable that, in a case where the focal length of the first lens L1 is f1, and the focal length of the fourth lens L4 is f4, the following conditional expression (4) is satisfied. The eyepiece lens 3 has an arrangement of a positive refractive power, a negative refractive power, a positive refractive power, and a positive refractive power in order from the observation object side. With this, a ray on the periphery side of the visual field directed from the display element 1 toward the eye point side schematically shows an aspect that a ray height is lowered from the first lens L1 to the second lens L2 and is raised in passing through the second lens L2 and the third lens L3. On the other hand, in order to obtain a wide view angle, in the fourth lens L4, it is preferable to secure a certain ray height. As a value of the conditional expression (4) is set to be not equal to or less than a lower limit, since the refractive power of the first lens L1 is not short with respect to the refractive power of the fourth lens L4, an angle of a ray on the periphery side of the visual field emitted from the first lens L1 toward the eye point side with respect to the optical axis Z1 is not excessively small. In a case where raising and lowering of the ray height and securing of the ray height in the fourth lens L4 are taken into consideration, since an angle of a ray on the periphery side of the visual field passing through the second lens L2 and the third lens L3 with respect to the optical axis Z1 is not excessively small, it is possible to suppress insufficient correction of lateral chromatic aberration. As the value of the conditional expression (4) is set to be not equal to or greater than an upper limit, since the refractive power of the first lens L1 is not excessive with respect to the refractive power of the fourth lens L4, an angle of an off-axial principal ray emitted from the first lens L1 to the eye point side with respect to the optical axis Z1 is not excessively large. In a case where raising and lowering of the ray height and securing of the ray height in the fourth lens L4 are taken into consideration, since the angle of the ray on the periphery side of the visual field passing through the second lens L2 and the third lens L3 with respect to the optical axis Z1 is not excessively large, it is possible to suppress excessive correction of lateral chromatic aberration. That is, as the conditional expression (4) is satisfied, it is advantageous in correction of lateral chromatic aberration. In addition, in a case where a configuration is made in which the following conditional expression (4-1) is further satisfied, it is possible to obtain more satisfactory characteristics.

$$2.7 < f4/f1 < 8 \quad (4)$$

$$3 < f4/f1 < 5 \quad (4\text{-}1)$$

In the eyepiece lens 3, it is preferable that, in a case where a radius of curvature of an eye point-side surface of the second lens L2 is R2r, and a radius of curvature of an observation object-side surface of the third lens L3 is R3f, the following conditional expression (5) is satisfied. The conditional expression (5) is an expression that defines a shape factor of an air lens formed between the second lens L2 and the third lens L3. As a value of the conditional expression (5) is set to be not equal to or less than a lower limit, it is possible to suppress excessive correction of spherical aberration in the air lens. As the value of the conditional expression (5) is set to be not equal to or greater than an upper limit, it is possible to suppress insufficient correction of spherical aberration in the air lens. In a case where spherical aberration on another lens surface is to be corrected with spherical aberration being insufficiently corrected in the air lens, lateral chromatic aberration occurs; however, as the value of the conditional expression (5) is set to be not equal to or greater than an upper limit, it is possible to restrain such a problem. In a case where a configuration is made in which the following conditional expression (5-1) is further satisfied, it is possible to obtain more satisfactory characteristics.

$$-2.1 < (R2r+R3f)/(R2r-R3f) < -0.2 \quad (5)$$

$$-1.75 < (R2r+R3f)/(R2r-R3f) < -0.6 \quad (5\text{-}1)$$

The above-described preferred configurations and available configurations may be any combination. For example, an eyepiece lens 3 of a preferred aspect as a combination of the above-described configurations consists of, in order from the observation object side to the eye point side, the first lens L1 having a positive refractive power, the second lens L2 having a negative refractive power, the third lens L3 having a positive refractive power, and the fourth lens L4 having a positive refractive power, all lenses are single lenses, the second lens L2 has a biconcave shape, the observation object-side surface of the fourth lens L4 has a convex shape, and the conditional expression (1) is satisfied.

In an eyepiece lens for a view finder of a digital camera or the like, recently, with advancement of an increase in the number of pixels of a liquid crystal display element, there is demand for a wider view angle and high resolution performance. However, in a case of obtaining a wider view angle, aberrations, such as astigmatism and chromatic aberration, significantly occur in the peripheral portion of the visual field, and both of a wider view angle and high resolution performance are hardly achieved. Therefore, as the above-described preferred aspect is adopted, it is possible to realize an eyepiece lens that allows observation with a wider view angle while suppressing aberrations, such as astigmatism and chromatic aberration.

It is preferable that the eyepiece lens 3 is configured to perform diopter adjustment. The eyepiece lens 3 can be configured such that diopter adjustment is performed by changing the distance between the display element 1 and the eyepiece lens 3 in the direction of the optical axis. In such a case, it is possible to reduce the amount of change in air interval during diopter adjustment.

In the example of FIG. 1, during diopter adjustment, the eyepiece lens 3 remains stationary, and the display element 1 is moved by changing the distance between the display element 1 and the eyepiece lens 3 in the direction of the optical axis. A two-way arrow below the display element 1 of FIG. 1 indicates that the display element 1 is moved along the optical axis Z1 of the eyepiece lens 3 during diopter adjustment. With such a configuration, it is possible to suppress a decrease in eye relief during diopter adjustment. "The eyepiece lens 3 remains stationary" used herein means that the eyepiece lens 3 remains stationary with respect to the apparatus in a case where the observation optical system is mounted in the apparatus. In such a case, during diopter adjustment, while the distance between the display element 1 and the eyepiece lens 3 in the direction of the optical axis is changed, a distance between the eyepiece lens 3 and the eye point EP can be made substantially constant, and the amount of decrease in eye relief is small even though diopter adjustment is performed. Thus, it is possible to allow satisfactory observation.

Next, an observation optical system 5 according to a second embodiment of the present disclosure will be described. In the following description of the second embodiment, a part of description of the same configurations as those in the first embodiment will not be repeated. The observation optical system 5 according to the second embodiment comprises a display element 1, and a lens group consisting of a plurality of lenses, and is configured so as to allow observation of an image displayed on the display element 1 through the lens group. In FIG. 1, the eyepiece lens 3 is shown as an example of the lens group.

In the observation optical system 5 according to the second embodiment, during diopter adjustment, the lens group remains stationary, and the display element 1 is moved by changing a distance between the display element 1 and the lens group in the direction of the optical axis. In addition, a configuration is made in which, in a case where a refractive index of at least one lens of the lens group with respect to d line is Nx, the following conditional expression (6) is satisfied. The meaning and the effect of "the lens group remains stationary" are the same as "the eyepiece lens 3 remains stationary" described in the first embodiment. As a value of the conditional expression (6) is set to be not equal to or less than a lower limit, correction of field curvature is facilitated. As the value of the conditional expression (6) is set to be not equal to or greater than an upper limit, since a material other than a material having a low Abbe number is usable for a lens, correction of chromatic aberration is facilitated. In a case where a configuration is made in which the following conditional expression (6-1) is further satisfied, it is possible to obtain more satisfactory characteristics.

$$1.76 < Nx < 2 \quad (6)$$

$$1.8 < Nx < 1.9 \quad (6\text{-}1)$$

The conditional expression (6) indicates a range of a comparatively high refractive index. There is an advantage that a lens of a high refractive index satisfying the conditional expression (6) is advantageous in correction of field curvature. In general, the higher the refractive index of the lens is, the higher the refractive power of the lens becomes, and the higher the refractive power of the lens is, the greater aberration fluctuation in a case where the ray passing through the lens fluctuates becomes. Therefore, the observation optical system according to the second embodiment is configured such that, during diopter adjustment, the display element is moved in a state in which the eyepiece lens 3 remains stationary. With this configuration, it is possible to reduce fluctuation of the height of the ray passing through the lens during diopter adjustment. That is, as the display element 1 is moved while the lens group remains stationary during diopter adjustment, and the conditional expression (6) is satisfied, it is possible to suppress aberration fluctuation during diopter adjustment using a lens of a high refractive index.

As shown in FIG. 1, the lens group may consist of four lenses. In this case, it is preferable that a lens satisfying the conditional expression (6) is a third lens from the side of the display element 1 among the four lenses of the lens group. In a case where the lens group consists of four lenses, and a wide view angle is provided, the ray height in the third lens from the side of the display element 1 is easily made high. Accordingly, as the third lens from the side of the display element 1 satisfies the conditional expression (6), it is possible to make an effect of suppressing aberration fluctuation during diopter adjustment remarkable. In particular, in a case where the above-described lens group consists of, in order from the observation object side, a positive lens, a negative lens, a positive lens, and a positive lens, it is possible to make the above-described effect remarkable.

The preferred configurations in the embodiments described above and available configurations may be any combination in the embodiments, and it is preferable that the configurations are suitably selectively employed according to a required specification. In a case where the lens group of the observation optical system 5 of the second embodiment consists of, in order from the observation object side, a positive lens, a negative lens, a positive lens, and a positive lens, the lens group can suitably selectively employ the configuration of the eyepiece lens 3 described in the first embodiment and the preferred configuration of the eyepiece lens 3.

Next, numerical examples of the eyepiece lens according to the embodiment of the present disclosure will be described.

Example 1

Since a configuration and luminous fluxes of an eyepiece lens 3 of Example 1 are shown in FIG. 1, and an illustration method and a configuration thereof are as described above, a part of overlapping description will not be repeated. The eyepiece lens 3 of Example 1 consists of, in order from the observation object side to the eye point side, a first lens L1 having a biconvex shape in the paraxial region, a second lens L2 having a biconcave shape in the paraxial region, a third lens L3 having a biconvex shape, and a fourth lens L4 having a biconvex shape in the paraxial region. The four lenses of the first lens L1 to the fourth lens L4 are all single lenses. The first lens L1, the second lens L2, and the fourth lens L4 are aspheric lenses. During diopter adjustment, the eyepiece lens 3 remains stationary, and the display element 1 is moved in the direction of the optical axis. With this, the distance between the display element 1 and the eyepiece lens 3 in the direction of the optical axis is changed. The above is the outline of the eyepiece lens 3 of Example 1.

Basic lens data of the eyepiece lens 3 of Example 1 is shown in Table 1. In Table 1, the display element 1, the optical member 2, and the eye point EP are also shown. In Table 1, a column of Sn shows a surface number of each surface in a case where a surface of the display element 1 is shown as OBJ, an observation object-side surface of the optical member 2 is regarded as a first surface, and the number increases one by one toward the eye point side, and a surface corresponding to the eye point EP is shown as EP. A column of R shows a radius of curvature of each surface, and a column of D shows a surface distance on the optical axis between each surface and an adjacent surface on the eye point side. A column of Nd shows a refractive index of each component with respect to d line, and a column of vd shows an Abbe number of each component with respect to d line.

In Table 1, a sign of a radius of curvature of a surface convex toward the observation object side is positive, and a sign of a radius of curvature of a surface convex toward the eye point side is negative. In Table 1, a variable surface distance during diopter adjustment is shown as DD[2].

Table 2 shows values of the focal length f of the eyepiece lens 3 and a view angle at a half angle of view. [°] in the column of the view angle means that a unit is degree. Table 2 shows a value of a state in which a diopter is −1.00. Table 3 shows values of variable surface distances for each diopter.

Table 4 shows aspheric coefficients of aspheric lenses included in the eyepiece lens 3. In the basic lens data, a mark "*" is attached to the surface number of an aspheric surface, and a numerical value of a paraxial radius of curvature is described in the column of the radius of curvature of the aspheric surface. In Table 4, a column of Sn shows the surface number of the aspheric surface, and columns of KA and Am (where m=3, 4, 5, . . . , 16) show numerical values of the aspheric coefficients for each aspheric surface. "E±n" (where n: integer) in the numerical values of the aspheric coefficients of Table 4 means "×10$^{\pm n}$". KA and Am are aspheric coefficients in the following aspheric surface expression.

$$Zd = C \times h^2 / \{1 + (1 - KA \times C^2 \times h^2)^{1/2}\} + \Sigma Am \times h^m$$

Here,

Zd: an aspheric surface depth (a length of a vertical line from a point on an aspheric surface at a height h to a plane perpendicular to the optical axis and in contact with an aspheric surface apex)

h: a height (a distance from the optical axis to the lens surface)

C: a reciprocal of a paraxial radius of curvature

KA and Am: aspheric coefficients, and

Σ in the aspheric surface expression means the sum with respect to m.

In data of the tables, although degree is used as a unit of an angle, mm (millimeter) is used as a unit of a length, and diopter is used as a unit of a diopter, other appropriate units may be used since optical systems are usable even though the optical systems are proportionally magnified or proportionally reduced. In the following tables, numerical values are rounded to a predetermined digit.

TABLE 1

Example 1

| Sn | R | D | Nd | vd |
|---|---|---|---|---|
| OBJ | ∞ | 4.3000 | | |
| 1 | ∞ | 1.2000 | 1.51680 | 64.20 |
| 2 | ∞ | DD[2] | | |
| *3 | 26.7692 | 6.0184 | 1.80625 | 40.91 |
| *4 | −11.2207 | 1.5242 | | |
| *5 | −9.2753 | 2.8278 | 1.63351 | 23.63 |
| *6 | 13.4282 | 0.6266 | | |
| 7 | 159.9161 | 6.9234 | 1.81600 | 46.62 |
| 8 | −19.0122 | 0.1000 | | |
| *9 | 20.3593 | 2.7869 | 1.53389 | 55.98 |
| *10 | −343.2501 | 15.0000 | | |
| EP | ∞ | | | |

TABLE 2

Example 1

| f | 17.26 |
|---|---|
| View Angle [°] | 20.0 |

TABLE 3

Example 1

| Diopter | −1.00 | −4.34 | 2.38 |
|---|---|---|---|
| DD[2] | 2.54 | 1.50 | 3.53 |

TABLE 4

Example 1

| Sn | 3 | 4 | 5 |
|---|---|---|---|
| KA | 4.9935872E+00 | 3.8199961E−02 | 8.0451835E−01 |
| A3 | 0.0000000E+00 | 0.0000000E+00 | 0.0000000E+00 |
| A4 | −2.7277890E−05 | 3.5295147E−04 | −3.5720032E−05 |
| A5 | −5.3616103E−05 | −2.1502831E−05 | 3.0066606E−06 |
| A6 | 2.3681929E−06 | −6.4628496E−06 | 1.4965371E−05 |
| A7 | 6.7209627E−06 | 5.0061587E−07 | −1.9259134E−05 |
| A8 | −1.8558929E−06 | 1.0252973E−07 | 6.0736819E−06 |
| A9 | 9.2622228E−08 | −7.1880255E−08 | −7.0096873E−07 |
| A10 | 1.6690221E−08 | 1.1899949E−08 | 1.2109115E−08 |
| A11 | −1.0057805E−09 | 1.5491352E−10 | 3.7118192E−09 |
| A12 | −1.4917926E−10 | −8.5827144E−11 | −1.3059819E−10 |
| A13 | 1.5948818E−11 | −1.4190084E−11 | −5.6934547E−11 |
| A14 | −1.8480537E−12 | 2.2409452E−12 | 1.0087840E−11 |
| A15 | 2.3595380E−13 | −4.7457710E−14 | −7.1918503E−13 |
| A16 | −1.0016961E−14 | −2.1322472E−15 | 1.9135841E−14 |
| Sn | 6 | 9 | 10 |
| KA | 8.2849014E−01 | −1.4018990E+00 | −2.0530490E+00 |
| A3 | 0.0000000E+00 | 0.0000000E+00 | 0.0000000E+00 |
| A4 | −9.8774485E−04 | −2.3385262E−06 | 1.3224120E−04 |
| A5 | −1.6972500E−05 | −9.7612011E−06 | −2.4067242E−05 |
| A6 | 2.0098254E−05 | 2.5061220E−07 | 2.7870350E−06 |
| A7 | −4.3835331E−08 | −2.9586751E−07 | 2.5444448E−07 |
| A8 | −2.1850591E−07 | 3.7999481E−08 | −1.9431758E−07 |
| A9 | 8.9099305E−10 | −1.4470868E−08 | 1.3163759E−08 |

TABLE 4-continued

Example 1

| A10 | 1.8158070E−09 | 2.0186526E−09 | 1.2223128E−09 |
|---|---|---|---|
| A11 | −1.5588733E−10 | 6.9870008E−12 | −8.4148159E−11 |
| A12 | 1.7140595E−11 | −7.9249125E−12 | −8.4751535E−12 |
| A13 | −1.7279251E−12 | −8.6440174E−13 | 1.4567577E−12 |
| A14 | 1.0597039E−13 | 1.3882954E−13 | −1.5511273E−13 |
| A15 | −4.7925822E−15 | −5.9535273E−15 | 9.7451727E−15 |
| A16 | 1.2479308E−16 | 8.2245050E−17 | −2.3225557E−16 |

Figure 2:
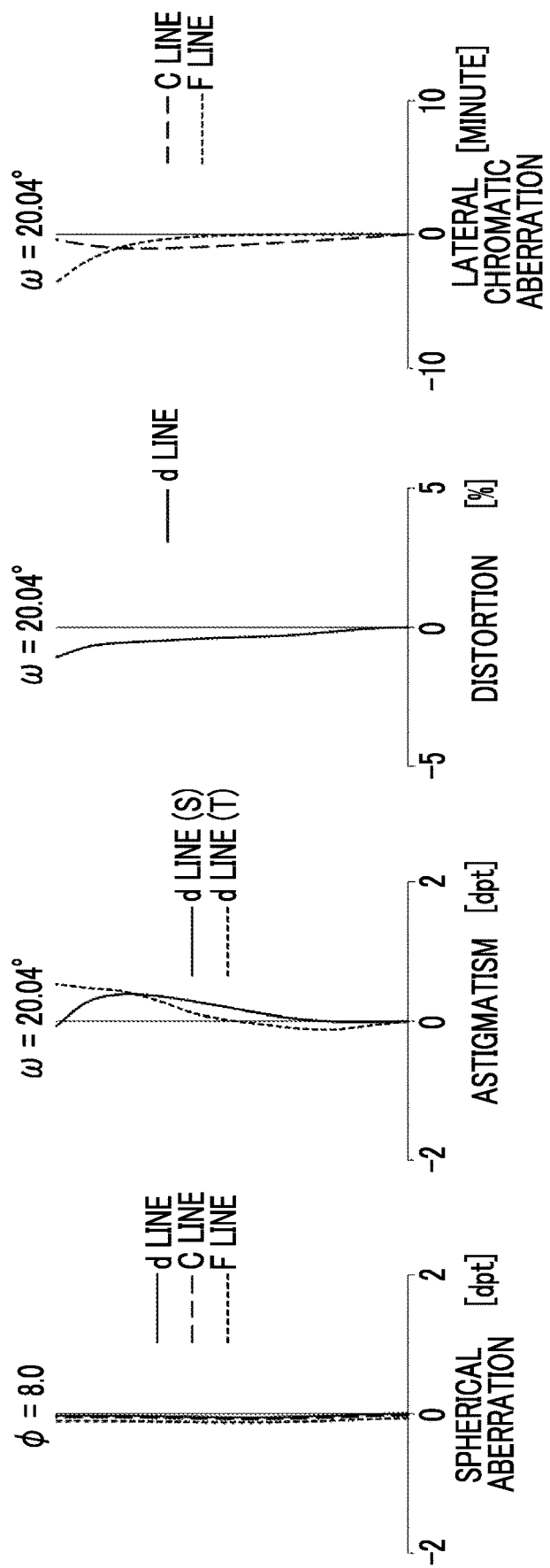
FIG. 2 is a spherical aberration diagram, an astigmatism diagram, a distortion diagram, and a lateral chromatic aberration diagram of the eyepiece lens of Example 1.
Figure 3:
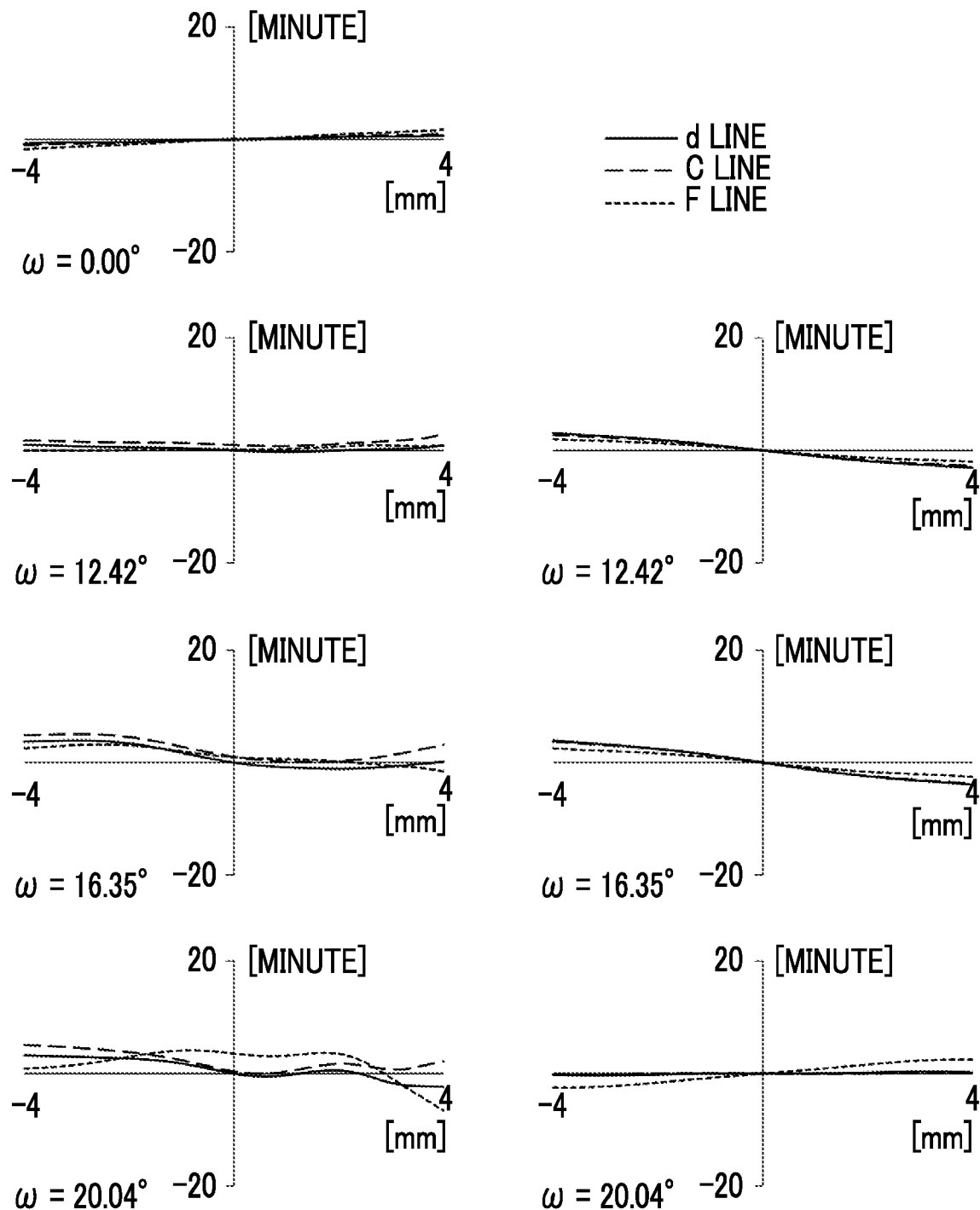
FIG. 3 is a lateral aberration diagram of the eyepiece lens of Example 1.

FIGS. 2 and 3 show aberration diagrams of the eyepiece lens 3 of Example 1 in a state in which the diopter is −1.00. In FIG. 2, in order from the left, spherical aberration, astigmatism, distortion, and lateral chromatic aberration are shown. In the spherical aberration diagram, aberrations with respect to d line, C line, and F line are shown by a solid line, a long dashed line, and a short dashed line, respectively. In the astigmatism diagram, an aberration in a sagittal direction with respect to d line is shown by a solid line, and an aberration in a tangential direction with respect to d line is shown by a short dashed line. In the distortion diagram, aberration with respect to d line is shown by a solid line. In the lateral chromatic aberration diagram, aberrations with respect to C line and F line are shown by a long dashed line and a short dashed line. dpt that is a unit of a horizontal axis of the spherical aberration diagram and the astigmatism diagram means diopter. Φ in the spherical aberration diagram means a diameter of the eye point EP in a case where mm (millimeter) is used as a unit, and ω in other aberration diagrams means a view angle at a half angle of view.

In FIG. 3, a left column shows lateral aberration in the tangential direction for each view angle, and a right column shows lateral aberration in the sagittal direction for each view angle. In FIG. 3, aberrations with respect to d line, C line, and F line are shown by a solid line, a long dashed line, and a short dashed line, respectively. ω of FIG. 3 means a view angle at a half angle of view.

The symbols, the meanings, the description methods, and the illustration methods of respective data relating to Example 1 described above are the same as those in the following examples unless otherwise specified, and thus, hereinafter, overlapping description will not be repeated.

Example 2

Figure 4:
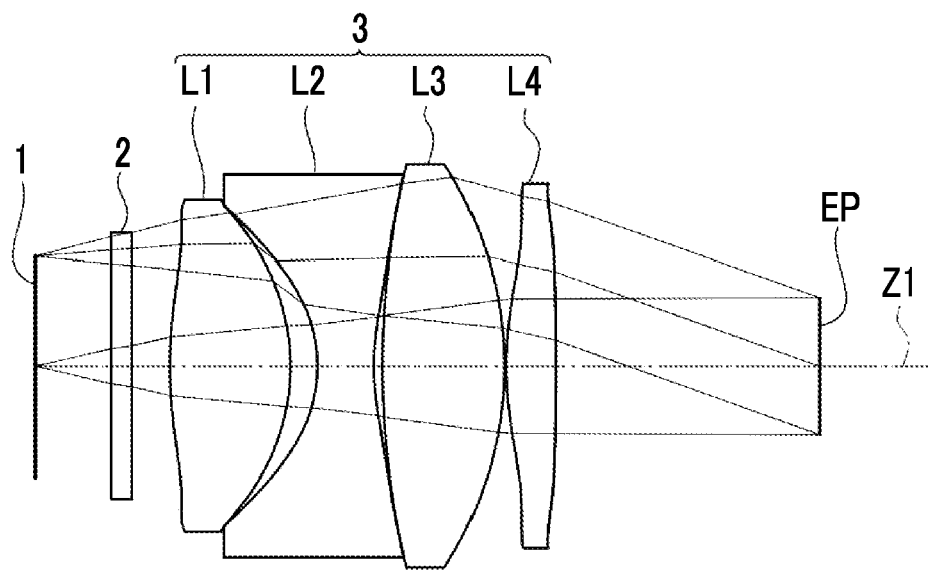
FIG. 4 is a sectional view showing a configuration and luminous fluxes of an eyepiece lens of Example 2.
Figure 5:
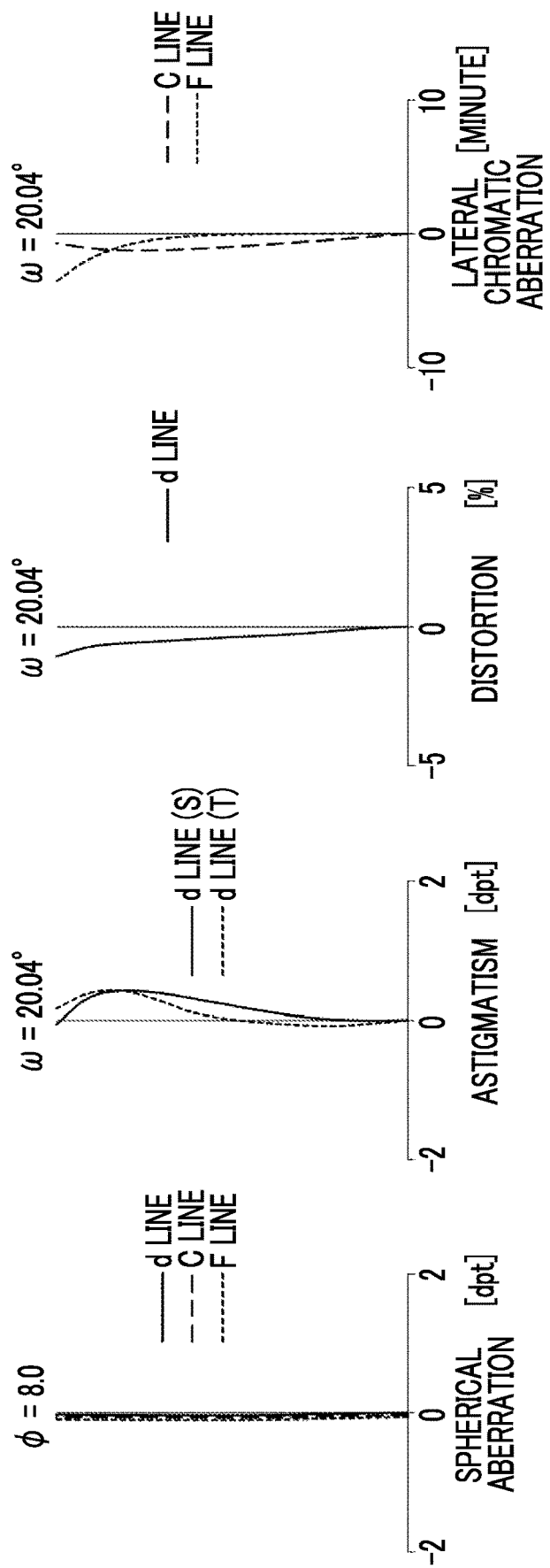
FIG. 5 is a spherical aberration diagram, an astigmatism diagram, a distortion diagram, and a lateral chromatic aberration diagram of the eyepiece lens of Example 2.
Figure 6:
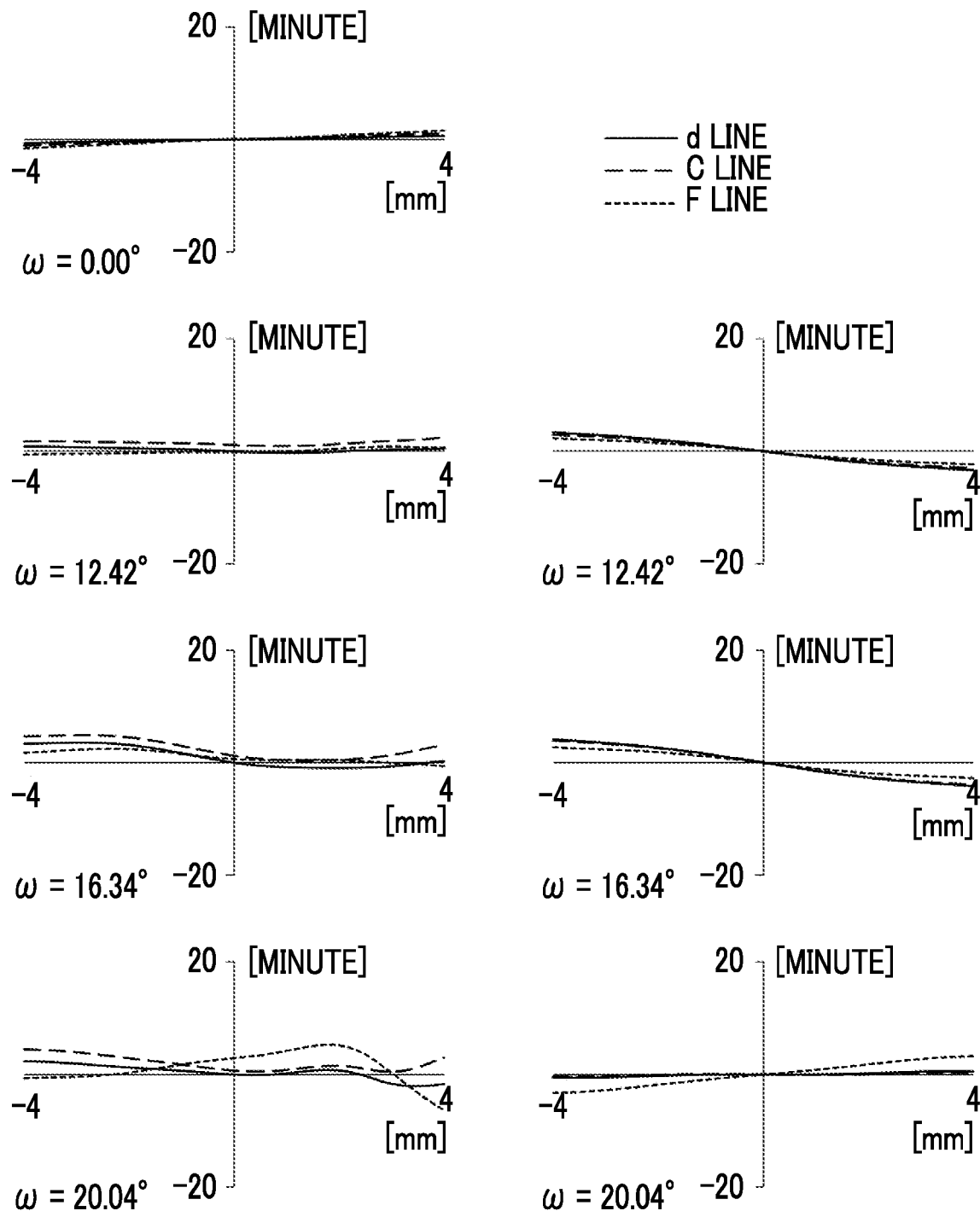
FIG. 6 is a lateral aberration diagram of the eyepiece lens of Example 2.

A configuration and luminous fluxes of an eyepiece lens 3 of Example 2 are shown in FIG. 4. The eyepiece lens 3 of Example 2 has the same configuration as the outline of the eyepiece lens 3 of Example 1. During diopter adjustment, the eyepiece lens 3 may remain stationary, and the display element 1 may be moved. In regard to the eyepiece lens 3 of Example 2, basic lens data is shown in Table 5, specifications are shown in Table 6, variable surface distances are shown in Table 7, aspheric coefficients are shown in Table 8, and aberration diagrams shown in FIGS. 5 and 6.

TABLE 5

Example 2

| Sn | R | D | Nd | vd |
|---|---|---|---|---|
| OBJ | ∞ | 4.3000 | | |
| 1 | ∞ | 1.2000 | 1.51680 | 64.20 |
| 2 | ∞ | DD[2] | | |
| *3 | 26.1752 | 6.8567 | 1.80625 | 40.91 |
| *4 | −12.1315 | 1.5178 | | |

TABLE 5-continued

Example 2

| Sn | R | D | Nd | vd |
|---|---|---|---|---|
| *5 | −9.1743 | 3.1994 | 1.63351 | 23.63 |
| *6 | 13.2021 | 0.5047 | | |
| 7 | 51.7168 | 6.8800 | 1.88300 | 40.76 |
| 8 | −22.1180 | 0.1000 | | |
| *9 | 21.9472 | 2.8172 | 1.53389 | 55.98 |
| *10 | −137.7660 | 15.0000 | | |
| EP | ∞ | | | |

TABLE 6

Example 2

| f | 17.26 |
|---|---|
| View Angle [°] | 20.0 |

TABLE 7

Example 2

| DD[2] | 2.14 | 1.13 | 3.16 |
|---|---|---|---|
| Diopter [dpt] | −1.00 | −4.28 | 2.47 |

TABLE 8

Example 2

| Sn | 3 | 4 | 5 |
|---|---|---|---|
| KA | 5.0000001E+00 | 4.8981210E−02 | 7.7934073E−01 |
| A3 | 0.0000000E+00 | 0.0000000E+00 | 0.0000000E+00 |
| A4 | −5.2562971E−05 | 2.0741182E−04 | −2.4258725E−04 |
| A5 | −5.0688002E−05 | −1.5715816E−05 | 6.1105807E−05 |
| A6 | 1.2320944E−05 | −6.1912558E−06 | −2.3085739E−05 |
| A7 | −6.3247439E−07 | 4.4099090E−07 | 1.7337957E−06 |
| A8 | 1.9154388E−07 | 2.5836315E−07 | 4.5439127E−07 |
| A9 | −1.6885030E−07 | −9.9026477E−08 | 3.2876727E−08 |
| A10 | 2.9805880E−08 | 1.3967526E−08 | −1.5984453E−08 |
| A11 | −1.0520260E−09 | −5.9482658E−10 | 1.5967956E−10 |
| A12 | −4.9761772E−11 | 8.4357047E−11 | −6.0152099E−11 |
| A13 | −1.8837589E−11 | −3.0526453E−11 | 5.1578415E−11 |
| A14 | 2.9088551E−12 | 3.0850743E−12 | −6.1369029E−12 |
| A15 | −7.9833547E−14 | −8.1825287E−14 | 2.6178380E−13 |
| A16 | −1.7911900E−15 | −1.1525296E−15 | −3.3982141E−15 |

| Sn | 6 | 9 | 10 |
|---|---|---|---|
| KA | 8.2583543E−01 | −1.2549999E+00 | 4.9999994E+00 |
| A3 | 0.0000000E+00 | 0.0000000E+00 | 0.0000000E+00 |
| A4 | −8.6864018E−04 | 1.3571531E−05 | 1.4068921E−04 |
| A5 | −7.9690361E−06 | −1.5833431E−05 | −2.3678460E−05 |
| A6 | 1.7485751E−05 | 5.9878632E−07 | 3.7625922E−06 |
| A7 | −4.2919349E−07 | −5.0203553E−08 | −2.4446807E−07 |
| A8 | −1.4421513E−07 | −3.4681666E−08 | −9.5672622E−08 |
| A9 | 4.0804777E−09 | −4.8003244E−10 | 6.0170226E−09 |
| A10 | 4.9438188E−10 | −5.2580900E−10 | 1.1692362E−09 |
| A11 | −3.9576193E−12 | 4.0348688E−10 | −1.5420817E−10 |
| A12 | 1.1617354E−12 | −5.3403712E−11 | 2.8286823E−11 |
| A13 | −4.5374623E−13 | 2.7851874E−12 | −4.7819597E−12 |
| A14 | 5.1540574E−14 | −6.0t58642E−14 | 3.9490439E−13 |
| A15 | −3.8643575E−15 | 7.0995468E−16 | −1.5655177E−14 |
| A16 | 1.2406578E−16 | −1.9048785E−17 | 2.5255761E−16 |

Example 3

Figure 7:
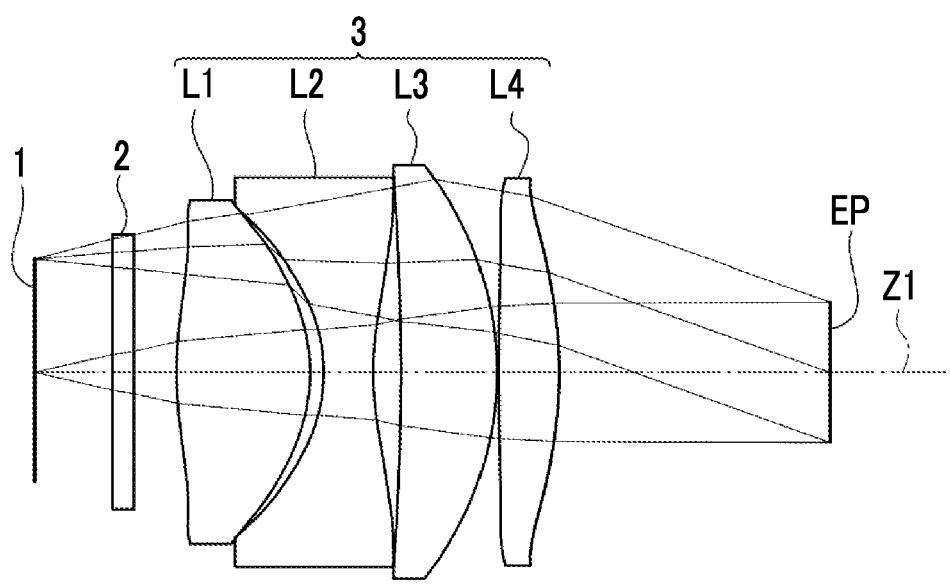
FIG. 7 is a sectional view showing a configuration and luminous fluxes of an eyepiece lens of Example 3.
Figure 8:
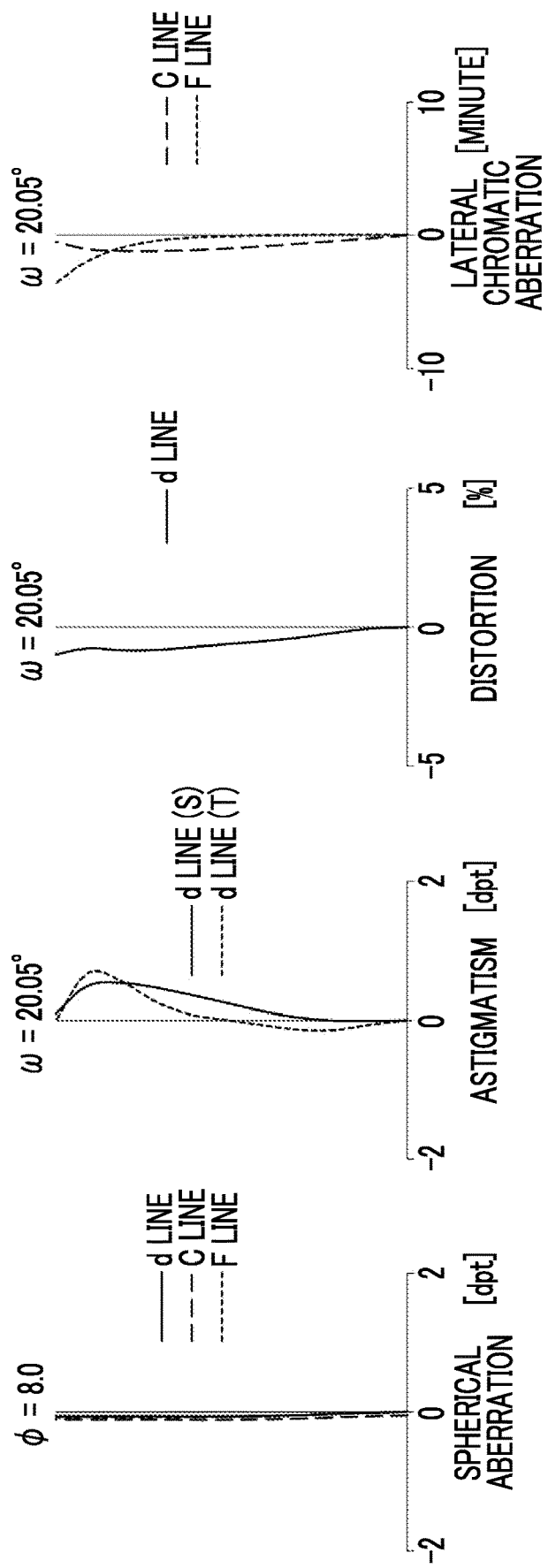
FIG. 8 is a spherical aberration diagram, an astigmatism diagram, a distortion diagram, and a lateral chromatic aberration diagram of the eyepiece lens of Example 3.
Figure 9:
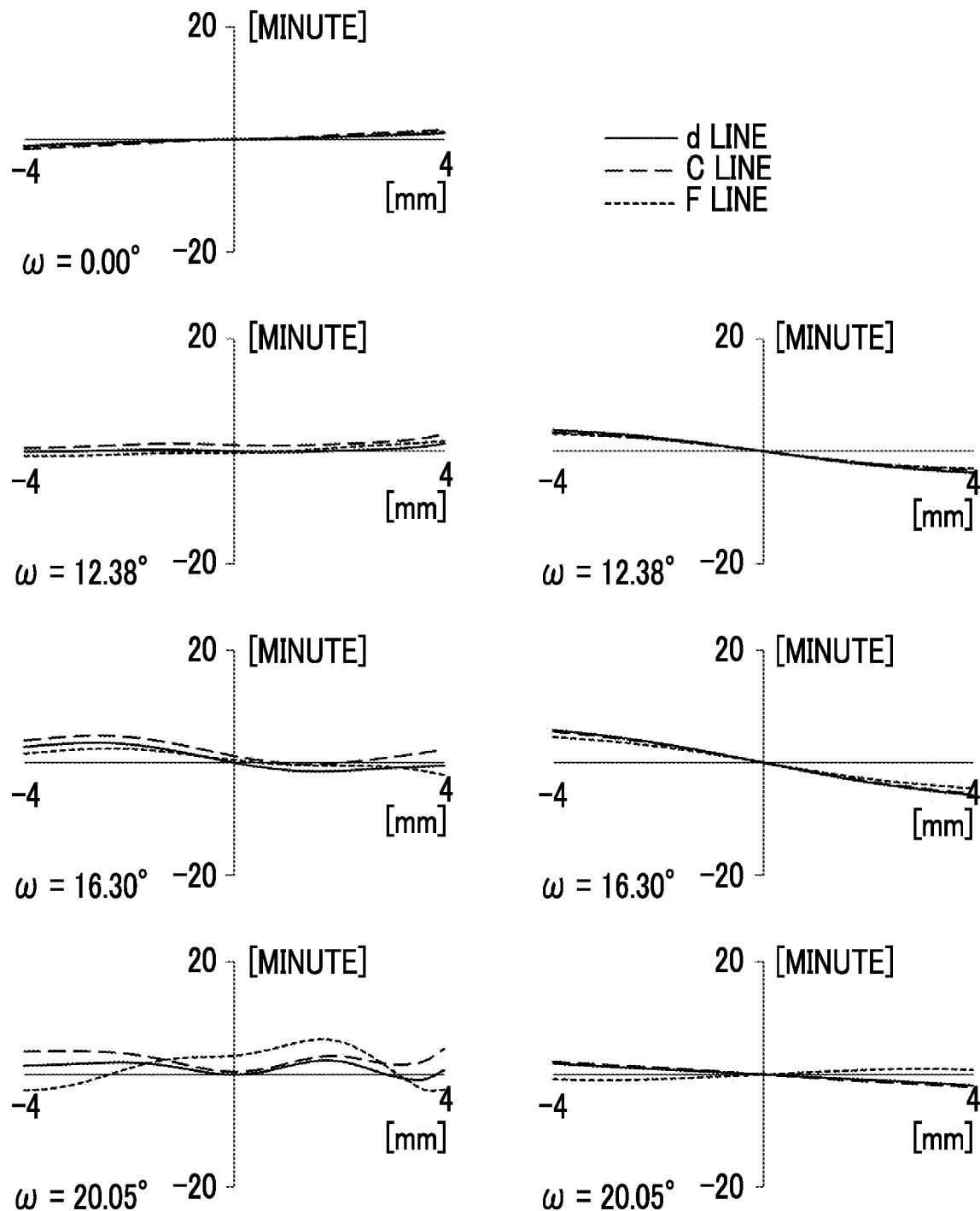
FIG. 9 is a lateral aberration diagram of the eyepiece lens of Example 3.

A configuration and luminous fluxes of an eyepiece lens 3 of Example 3 are shown in FIG. 7. The eyepiece lens 3 of Example 3 has the same configuration as the outline of the eyepiece lens 3 of Example 1, excluding that the third lens L3 is a positive meniscus lens convex toward the eye point side. During diopter adjustment, the eyepiece lens 3 may remain stationary, and the display element 1 may be moved. In regard to the eyepiece lens 3 of Example 3, basic lens data is shown in Table 9, specifications are shown in Table 10, variable surface distances are shown in Table 11, aspheric coefficients are shown in Table 12, and aberration diagrams are shown in FIGS. 8 and 9.

TABLE 9

Example 3

| Sn | R | D | Nd | vd |
|---|---|---|---|---|
| OBJ | ∞ | 4.3000 | | |
| 1 | ∞ | 1.2000 | 1.51680 | 64.20 |
| 2 | ∞ | DD[2] | | |
| *3 | 23.6587 | 7.4016 | 1.80625 | 40.91 |
| *4 | −10.3654 | 0.7476 | | |
| *5 | −10.2251 | 2.7407 | 1.63351 | 23.63 |
| *6 | 15.7731 | 1.5328 | | |
| 7 | −152.9384 | 5.2879 | 1.81600 | 46.62 |
| 8 | −19.2861 | 0.1000 | | |
| *9 | 267.4061 | 3.3457 | 1.53389 | 55.98 |
| *10 | −24.8594 | 15.0000 | | |
| EP | ∞ | | | |

TABLE 10

Example 3

| f | 17.26 |
|---|---|
| View Angle [°] | 20.0 |

TABLE 11

Example 3

| DD[2] | 2.38 | 1.35 | 3.38 |
|---|---|---|---|
| Diopter | −1.00 | −4.32 | 2.41 |

TABLE 12

Example 3

| Sn | 3 | 4 | 5 |
|---|---|---|---|
| KA | 4.4683342E+00 | 1.6189781E−01 | 8.3877736E−01 |
| A3 | 0.0000000E+00 | 0.0000000E+00 | 0.0000000E+00 |
| A4 | −1.3795537E−04 | −5.7389511E−05 | −6.2392711E−04 |
| A5 | −4.5842164E−05 | 5.4398073E−05 | 7.4247929E−05 |
| A6 | 9.9941484E−06 | −5.1084421E−06 | 5.9104873E−05 |
| A7 | 6.9698261E−07 | −5.8859275E−07 | −3.0329764E−05 |
| A8 | −2.0047163E−07 | −5.8452792E−08 | 7.1042150E−06 |
| A9 | −1.1533947E−07 | 2.6546747E−08 | −7.8071018E−07 |
| A10 | 3.4508576E−08 | 2.7470713E−09 | 1.1469817E−08 |
| A11 | −4.9648787E−09 | −9.1388158E−10 | 4.0914319E−09 |
| A12 | 7.7487629E−10 | 4.3742443E−11 | 5.2577719E−10 |
| A13 | −1.0903136E−10 | 3.5650140E−12 | −2.3437399E−10 |
| A14 | 8.7069847E−12 | −6.3757263E−13 | 2.8715813E−11 |
| A15 | −3.1523622E−13 | 5.3124964E−14 | −1.6258964E−12 |
| A16 | 3.3712262E−15 | −1.8918958E−15 | 3.6283202E−14 |

| Sn | 6 | 9 | 10 |
|---|---|---|---|
| KA | 8.0434545E−01 | −4.9999996E+00 | −5.0000035E+00 |
| A3 | 0.0000000E+00 | 0.0000000E+00 | 0.0000000E+00 |
| A4 | −6.7507052E−04 | 3.1045092E−05 | 3.6311209E−05 |
| A5 | 6.8443793E−06 | 1.4863482E−06 | −2.0726470E−05 |
| A6 | 1.4718815E−05 | −2.4903191E−06 | 5.7141803E−06 |
| A7 | 8.3709634E−09 | 5.9682217E−07 | −6.4320660E−07 |

TABLE 12-continued

Example 3

| | | | |
|---|---|---|---|
| A8 | −3.4986133E−07 | −8.5543998E−08 | 1.0587754E−08 |
| A9 | 2.1567730E−08 | 5.3923922E−09 | 1.1218294E−09 |
| A10 | 1.7353220E−09 | −1.3744368E−11 | 3.5076736E−10 |
| A11 | −1.7674002E−10 | 2.0678566E−12 | −1.0470377E−10 |
| A12 | −2.7732892E−12 | −9.9884060E−12 | 1.6226641E−11 |
| A13 | 1.2354162E−12 | 2.3564796E−12 | −1.5892578E−12 |
| A14 | −1.1546900E−13 | −2.3248036E−13 | 1.2360574E−13 |
| A15 | 5.7250711E−15 | 1.0850798E−14 | −7.3182074E−15 |
| A16 | −1.1075637E−16 | −2.0515474E−16 | 1.9708453E−16 |

Example 4

Figure 10:
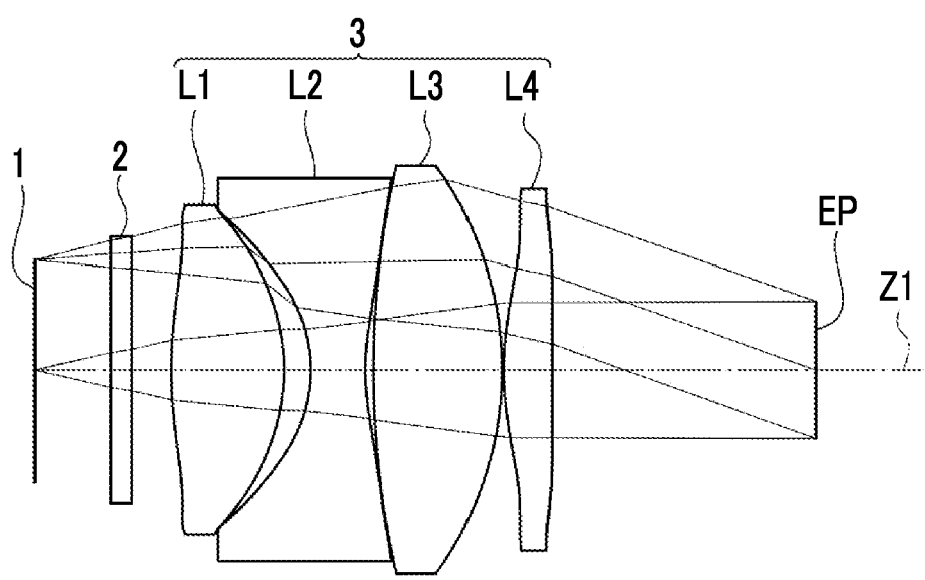
FIG. 10 is a sectional view showing a configuration and luminous fluxes of an eyepiece lens of Example 4.
Figure 11:
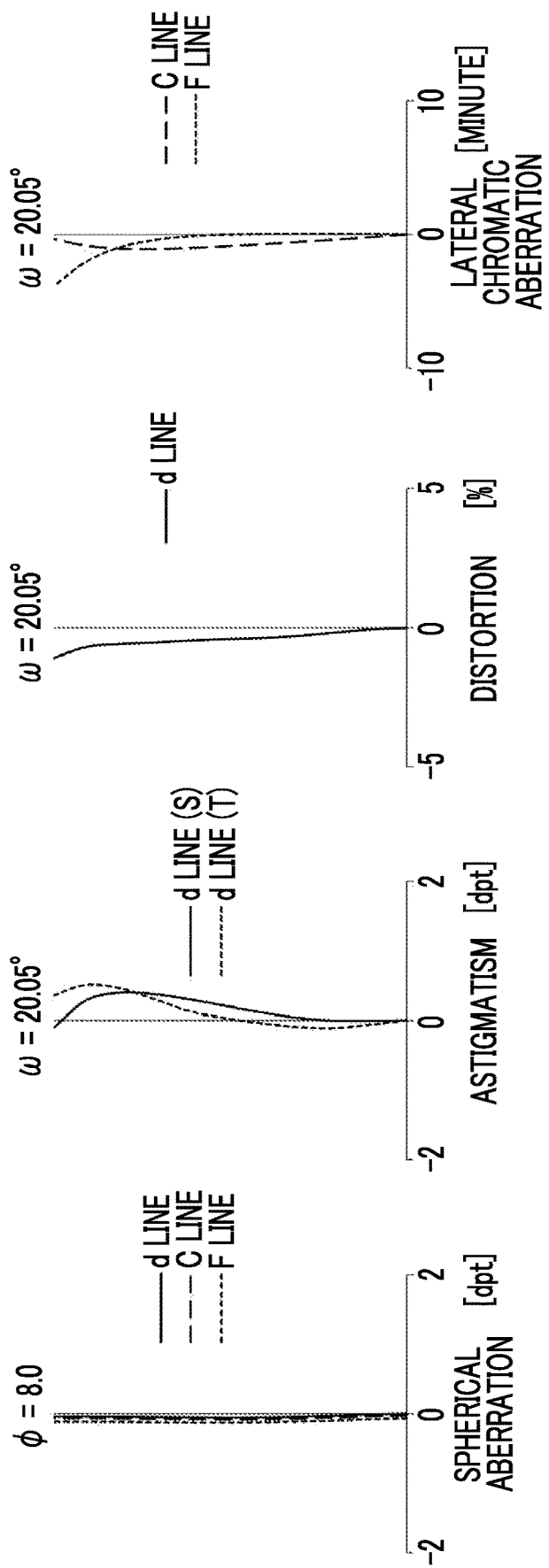
FIG. 11 is a spherical aberration diagram, an astigmatism diagram, a distortion diagram, and a lateral chromatic aberration diagram of the eyepiece lens of Example 4.
Figure 12:
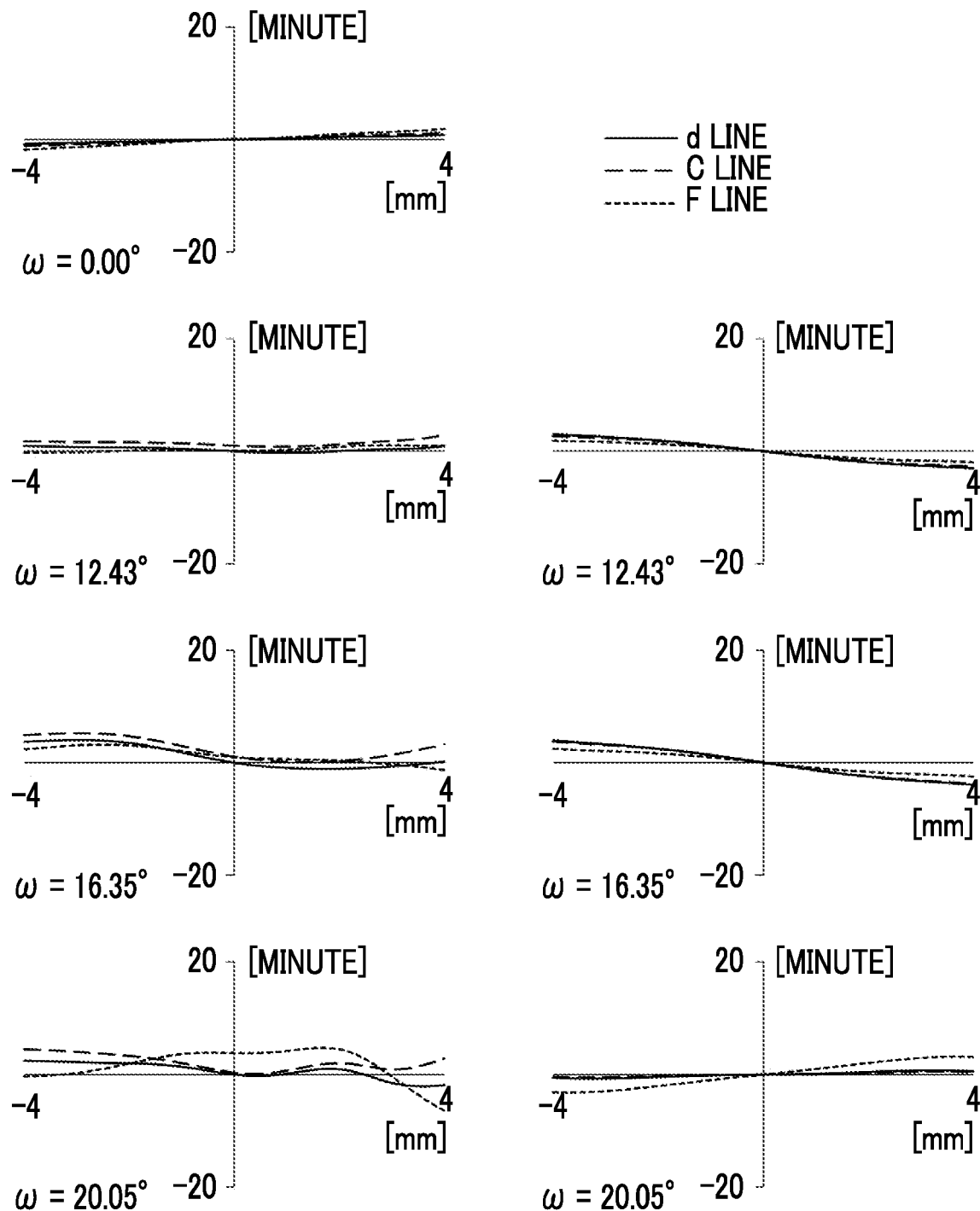
FIG. 12 is a lateral aberration diagram of the eyepiece lens of Example 4.

A configuration and luminous fluxes of an eyepiece lens 3 of Example 4 are shown in FIG. 10. The eyepiece lens 3 of Example 4 has the same configuration as the outline of the eyepiece lens 3 of Example 1. During diopter adjustment, the eyepiece lens 3 may remain stationary, and the display element 1 may be moved. In regard to the eyepiece lens 3 of Example 4, basic lens data is shown in Table 13, specifications are shown in Table 14, variable surface distances are shown in Table 15, aspheric coefficients are shown in Table 16, and aberration diagrams are shown in FIGS. 11 and 12.

TABLE 13

Example 4

| Sn | R | D | Nd | vd |
|---|---|---|---|---|
| OBJ | ∞ | 4.3000 | | |
| 1 | ∞ | 1.2000 | 1.51680 | 64.20 |
| 2 | ∞ | DD[2] | | |
| *3 | 27.3629 | 6.4273 | 1.80625 | 40.91 |
| *4 | −11.4855 | 1.4960 | | |
| *5 | −9.0268 | 3.1013 | 1.63351 | 23.63 |
| *6 | 13.2176 | 0.4635 | | |
| 7 | 54.7824 | 7.2865 | 1.83481 | 42.74 |
| 8 | −20.8317 | 0.1000 | | |
| *9 | 20.5809 | 2.7498 | 1.53389 | 55.98 |
| *10 | −351.5611 | 15.0000 | | |
| EP | ∞ | | | |

TABLE 14

Example 4

| | |
|---|---|
| f | 17.26 |
| View Angle [°] | 20.1 |

TABLE 15

Example 4

| | | | |
|---|---|---|---|
| DD[2] | 2.23 | 1.24 | 3.27 |
| Diopter | −1.00 | −4.21 | 2.52 |

TABLE 16

Example 4

| Sn | 3 | 4 | 5 |
|---|---|---|---|
| KA | 4.9647805E+00 | −6.4903463E−02 | 7.5661589E−01 |
| A3 | 0.0000000E+00 | 0.0000000E+00 | 0.0000000E+00 |
| A4 | −2.4746006E−05 | 2.5491393E−04 | −2.1982416E−04 |
| A5 | −6.8121552E−05 | 2.3245455E−05 | 9.3144970E−05 |

TABLE 16-continued

Example 4

| | | | |
|---|---|---|---|
| A6 | 1.9999740E−05 | −2.7758426E−07 | −3.0016752E−05 |
| A7 | −4.6756700E−06 | −1.8110376E−06 | 6.7322934E−07 |
| A8 | 2.2129632E−06 | 6.8666155E−07 | 7.8236736E−07 |
| A9 | −7.5256501E−07 | −1.6031332E−07 | 5.7899262E−08 |
| A10 | 1.1607928E−07 | 1.9627430E−08 | −2.8607797E−08 |
| A11 | −5.5793643E−09 | −3.9066524E−10 | 6.9403490E−10 |
| A12 | −5.6200494E−10 | −2.0483069E−11 | 1.8006294E−10 |
| A13 | 9.8809679E−11 | −2.2624531E−11 | 2.4504925E−12 |
| A14 | −7.8340390E−12 | 2.9996960E−12 | −1.5297958E−12 |
| A15 | 4.4862985E−13 | −9.0002332E−14 | 3.3919611E−14 |
| A16 | −1.3038114E−14 | −1.0550708E−15 | 1.3402065E−15 |
| Sn | 6 | 9 | 10 |
| KA | 8.2097765E−01 | −1.4189909E+00 | 5.0000060E+00 |
| A3 | 0.0000000E+00 | 0.0000000E+00 | 0.0000000E+00 |
| A4 | −9.4980779E−04 | −3.4807568E−05 | 1.0353437E−04 |
| A5 | 1.5576842E−06 | 1.0261225E−06 | −1.2875147E−05 |
| A6 | 1.9261702E−05 | −1.1602396E−06 | 2.5803458E−06 |
| A7 | −1.0281660E−06 | −1.9182715E−07 | −3.5884364E−07 |
| A8 | −8.1558228E−08 | 3.0370104E−09 | −8.0569883E−08 |
| A9 | 7.8013586E−10 | −6.4572807E−09 | 1.0594388E−08 |
| A10 | 1.9575477E−09 | 1.6253398E−09 | −5.7679738E−11 |
| A11 | −5.4145540E−10 | −5.8015869E−11 | 8.1416603E−11 |
| A12 | 9.6644665E−11 | −1.6949313E−12 | −1.7460723E−11 |
| A13 | −1.0470339E−11 | −4.6875621E−13 | 1.2310920E−12 |
| A14 | 7.0786225E−13 | 5.6321833E−14 | −5.2085001E−14 |
| A15 | −2.9009717E−14 | −1.5225887E−15 | 1.3666863E−15 |
| A16 | 5.5278941E−16 | −1.4402002E−18 | −5.0684939E−18 |

Example 5

Figure 13:
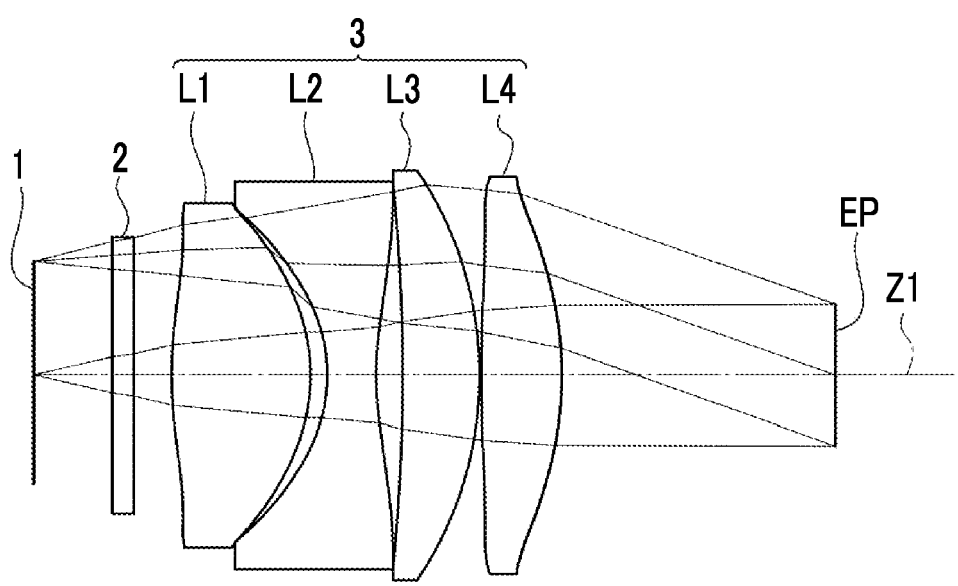
FIG. 13 is a sectional view showing a configuration and luminous fluxes of an eyepiece lens of Example 5.
Figure 14:
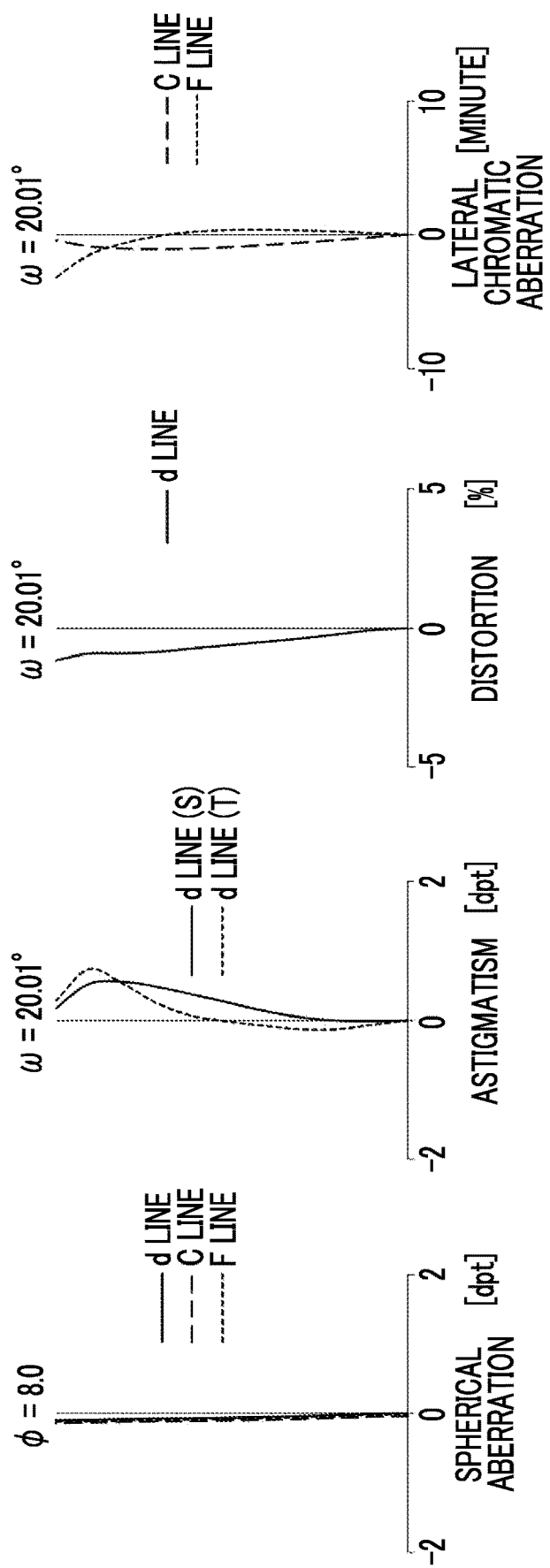
FIG. 14 is a spherical aberration diagram, an astigmatism diagram, a distortion diagram, and a lateral chromatic aberration diagram of the eyepiece lens of Example 5.
Figure 15:
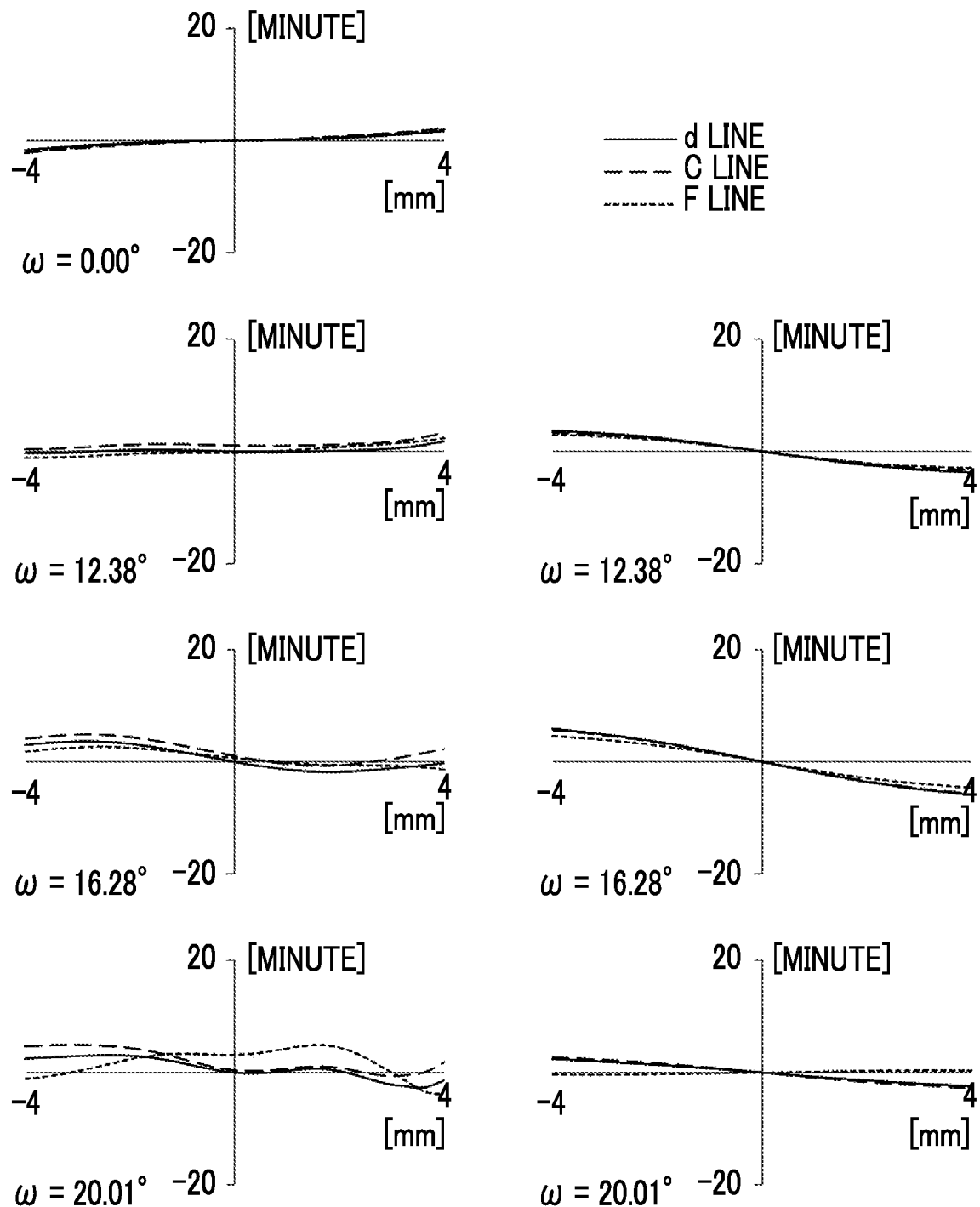
FIG. 15 is a lateral aberration diagram of the eyepiece lens of Example 5.

A configuration and luminous fluxes of an eyepiece lens 3 of Example 5 are shown in FIG. 13. The eyepiece lens 3 of Example 5 has the same configuration as the outline of the eyepiece lens 3 of Example 1, excluding that the third lens L3 is a positive meniscus lens convex toward the eye point side. During diopter adjustment, the eyepiece lens 3 may remain stationary, and the display element 1 may be moved. In regard to the eyepiece lens 3 of Example 5, basic lens data is shown in Table 17, specifications are shown in Table 18, variable surface distances are shown in Table 19, aspheric coefficients are shown in Table 20, and aberration diagrams are shown in FIGS. 14 and 15.

TABLE 17

Example 5

| Sn | R | D | Nd | vd |
|---|---|---|---|---|
| OBJ | ∞ | 4.3000 | | |
| 1 | ∞ | 1.2000 | 1.51680 | 64.20 |
| 2 | ∞ | DD[2] | | |
| *3 | 24.5996 | 7.5834 | 1.80625 | 40.91 |
| *4 | −10.6388 | 0.9159 | | |
| *5 | −9.8566 | 2.6840 | 1.63351 | 23.63 |
| *6 | 16.9770 | 1.4557 | | |
| 7 | −112.6371 | 4.2354 | 1.81600 | 46.62 |
| 8 | −21.1494 | 0.1000 | | |
| *9 | 101.2847 | 4.4218 | 1.53389 | 55.98 |
| *10 | −19.9279 | 15.0000 | | |
| EP | ∞ | | | |

TABLE 18

Example 5

| | |
|---|---|
| f | 17.27 |
| View Angle [°] | 20.0 |

TABLE 18-continued

Example 5

TABLE 19

| | Example 5 | | |
|---|---|---|---|
| DD[2] | 2.08 | 1.06 | 3.09 |
| Diopter | −1.00 | −4.30 | 2.44 |

TABLE 20

| | Example 5 | | |
|---|---|---|---|
| Sn | 3 | 4 | 5 |
| KA | 4.9834627E+00 | 4.3528264E−03 | 7.6844744E−01 |
| A3 | 0.0000000E+00 | 0.0000000E+00 | 0.0000000E+00 |
| A4 | −1.9491252E−04 | 6.9581659E−05 | −3.4615024E−04 |
| A5 | 6.2844543E−06 | 2.1640819E−05 | 4.3750488E−05 |
| A6 | −3.0616930E−06 | −7.6402543E−06 | 2.0973802E−06 |
| A7 | 2.4081035E−06 | −9.9625158E−08 | −2.4428281E−06 |
| A8 | −7.4224346E−07 | 1.5824227E−07 | 7.3260920E−07 |
| A9 | 6.4084291E−08 | −1.3127977E−08 | 1.5344379E−08 |
| A10 | 3.6273309E−09 | 1.6972794E−09 | −3.0272910E−08 |
| A11 | −7.9982224E−10 | −2.0931977E−10 | 4.7321112E−09 |
| A12 | 7.5764911E−11 | −5.4777005E−12 | −4.1583192E−10 |
| A13 | −1.0730424E−11 | 1.8024549E−12 | 2.6582890E−11 |
| A14 | 5.5241935E−13 | −2.0032333E−13 | −5.595056tE−13 |
| A15 | 3.9016344E−14 | 2.9861523E−14 | −6.2343373E−14 |
| A16 | −3.0626384E−15 | −1.5127443E−15 | 3.1801071E−15 |
| Sn | 6 | 9 | 10 |
| KA | 8.0624492E−01 | −5.0000000E+00 | −2.1661296E+00 |
| A3 | 0.0000000E+00 | 0.0000000E+00 | 0.0000000E+00 |
| A4 | −6.5038830E−04 | −1.5441400E−05 | 1.3588062E−05 |
| A5 | 2.3225331E−06 | 9.9881793E−06 | −9.5302818E−06 |
| A6 | 1.2066133E−05 | −1.0920572E−06 | 3.1868888E−06 |
| A7 | 9.0379350E−07 | −6.6239108E−07 | −3.0993196E−07 |
| A8 | −4.9440353E−07 | 1.7672210E−07 | −4.6554632E−08 |
| A9 | 4.1975087E−08 | −1.9260761E−08 | 1.0613657E−08 |
| A10 | 6.1595738E−10 | 9.2465983E−10 | −5.0068601E−10 |
| A11 | −2.2495955E−10 | −1.0443664E−11 | −3.6709582E−11 |
| A12 | 1.6495354E−11 | 1.3311962E−12 | 3.5684361E−12 |
| A13 | 1.9257944E−13 | −4.3665399E−13 | 2.2438496E−13 |
| A14 | −1.2597486E−13 | 6.1513858E−14 | −2.8184227E−14 |
| A15 | 8.0431754E−15 | −4.0187981E−15 | 1.7288094E−16 |

TABLE 20-continued

| | Example 5 | | |
|---|---|---|---|
| A16 | −1.6176541E−16 | 8.9751290E−17 | 2.9638000E−17 |

Table 21 shows corresponding values of the conditional expressions (1) to (6) of the eyepiece lenses 3 of Examples 1 to 5. A column of the conditional expression (6) shows the reference numerals of the lenses satisfying the conditional expression (6) in parentheses below the corresponding values.

TABLE 21

| Expression Number | | Example 1 | Example 2 | Example 3 | Example 4 | Example 5 |
|---|---|---|---|---|---|---|
| (1) | N3 | 1.81600 | 1.88300 | 1.81600 | 1.83480 | 1.81600 |
| (2) | f2/f4 | −0.229 | −0.227 | −0.220 | −0.220 | −0.300 |
| (3) | f/f1 | 1.635 | 1.545 | 1.744 | 1.593 | 1.694 |
| (4) | f4/f1 | 3.420 | 3.193 | 4.320 | 3.370 | 3.100 |
| (5) | $\dfrac{R2r + R3f}{R2r - R3f}$ | −1.183 | −1.686 | −0.813 | −1.636 | −0.738 |
| (6) | Nx | 1.80625 (L1) 1.81600 (L3) | 1.80625 (L1) 1.88300 (L3) | 1.80625 (L1) 1.81600 (L3) | 1.80625 (L1) 1.83481 (L3) | 1.80625 (L1) 1.81600 (L3) |

As can be understood from the above-described data, the eyepiece lenses 3 of Examples 1 to 5 are configured such that the view angle at the half angle of view is equal to or greater than 17 degrees, have a wide view angle, and realize high optical performance with aberrations satisfactorily corrected.

Figure 16:
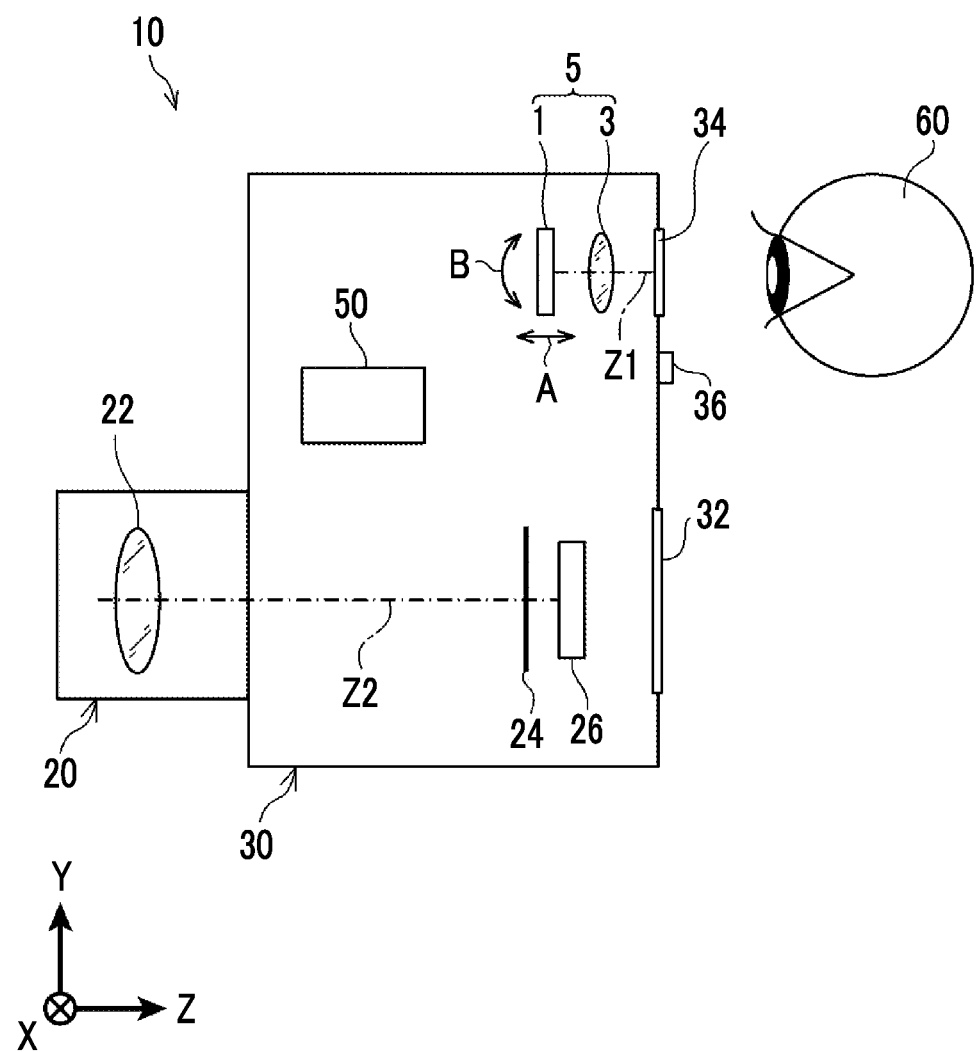
FIG. 16 is a schematic configuration diagram of an optical apparatus according to an embodiment.

Next, an optical apparatus comprising the observation optical system 5 according to the embodiment of the present disclosure will be described. FIG. 16 is a schematic configuration diagram of a camera 10 that is an optical apparatus according to an embodiment of the present disclosure. The camera 10 is a digital camera as an example. The camera 10 comprises a camera body 30.

A lens barrel 20 is attachably and detachably mounted on a front surface of the camera body 30. The lens barrel 20 comprises an imaging lens 22 therein. Although the imaging lens 22 actually includes a plurality of lenses and an aperture stop, in FIG. 16, the imaging lens 22 is conceptually shown. Inside the camera body 30 on an extension of an optical axis Z2 of the imaging lens 22, a shutter 24 and an imaging element 26 are disposed.

Inside the camera body 30, a display element 1 and an eyepiece lens 3 are disposed. Although the eyepiece lens 3 actually consists of a plurality of lenses, in FIG. 16, the eyepiece lens 3 is conceptually shown. The display element 1 has a display surface substantially perpendicular to the optical axis Z1 of the eyepiece lens 3 on a surface facing the eyepiece lens 3. The display element 1 and the eyepiece lens 3 configure the observation optical system 5 according to the embodiment of the present disclosure. The observation optical system 5 configures an electronic view finder along with an observation window 34 provided in a rear surface of the camera body 30. The display element 1 and the observation window 34 are disposed on an extension of the optical axis Z1 with the eyepiece lens 3 sandwiched therebetween.

Figure 17:
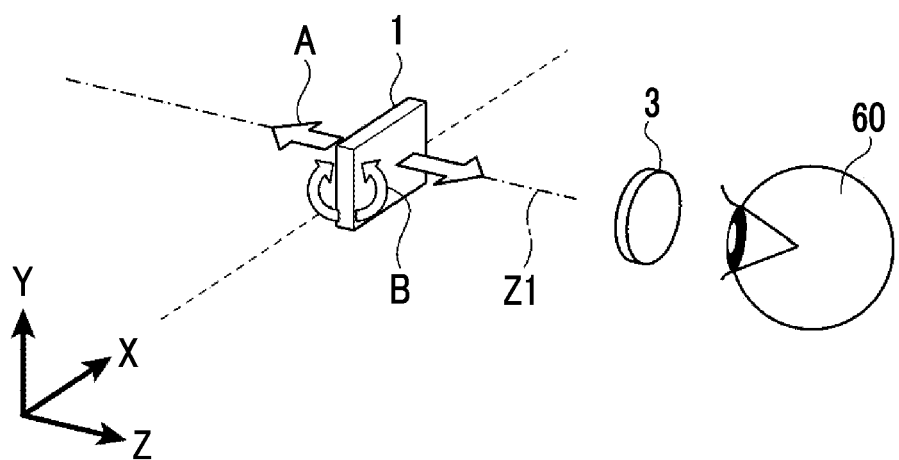
FIG. 17 is a diagram illustrating movement of a display element.

The display element 1 is configured to be movable by a drive unit (not shown) provided inside the camera body 30. In FIG. 16, a direction parallel to the optical axis Z1 of the eyepiece lens 3 is referred to as a Z direction, a direction perpendicular to the paper of FIG. 16 is referred to as an X direction, and a direction perpendicular to the Z direction and the X direction is referred to as a Y direction. The display element 1 is movable straight in a direction parallel to the Z direction as indicated by an arrow A in FIG. 16. Furthermore, the display element 1 is rotationally movable with an axis passing through the center of the display element 1 and being parallel to the X direction as a rotation axis as indicated by an arrow B in FIG. 16. For ease of understanding, the direction of straight movement and the direction of rotational movement of the display element 1 are indicated by an arrow A and an arrow B in a perspective view of FIG. 17, respectively. During straight movement and rotational movement of the display element 1, the eyepiece lens 3 remains stationary with respect to the camera body 30. A relative positional relationship between the display element 1 and the eyepiece lens 3 is changed by at least one of straight movement or rotational movement of the display element 1, and accordingly, diopter adjustment can be performed.

In the rear surface of the camera body 30, a diopter adjustment dial 36 that performs diopter adjustment by making the display element 1 perform at least one of straight movement or rotational movement, and a rear liquid crystal panel 32 that displays an image are provided. Inside the camera body 30, a processor 50 that performs image processing, various kinds of arithmetic processing, control of various components, and the like is provided.

In the camera 10, a subject image captured by the imaging lens 22 is formed on an imaging surface of the imaging element 26. The imaging element 26 outputs an image indicating the formed subject image to the processor 50. The processor 50 subjects the image to image processing. The image subjected to the image processing is displayed on the rear liquid crystal panel 32 and the display element 1.

An observer 60 looks into the observation window 34 and observes the image displayed on the display element 1 through the eyepiece lens 3. The observer 60 performs diopter adjustment by operating the diopter adjustment dial 36 to make the display element 1 perform at least one of straight movement or rotational movement according to the eyesight of the observer 60. With this, the observer 60 can observe the image displayed on the display element 1 in a suitable state.

In the camera 10, the display element 1 is configured to be not only movable straight in the direction of the optical axis Z1 but also movable rotationally around the axis parallel to the X direction. For this reason, even though a part of the display element 1 in the Y direction is out of focus, for example, when the observer 60 looks into the observation window 34, the observer 60 performs adjustment by rotationally moving the display element 1 and can bring the display element 1 into a more easily visible state. Even in a case where the observer 60 who wears glasses with different diopter between an upper portion and a lower portion of a lens, such as bifocal glasses, observes, the observer 60 performs adjustment by rotationally moving the display element 1 and can bring the display element 1 into a more easily visible state.

Although the technique of the present disclosure has been described above in connection with the embodiments and the examples, the technique of the present disclosure is not limited to the above-described embodiments and the examples, and various modifications can be made. For example, the radius of curvature, the surface distance, the refractive index, the Abbe number, the aspheric coefficient, and the like of each lens are not limited to the values in the above-described numerical examples, and may take other values. The optical apparatus according to the embodiment of the present disclosure is not limited to the above-described example, and the present disclosure can also be applied to a film camera, a video camera, a head-mounted display, and the like.

What is claimed is:

1. An eyepiece lens consisting of, in order from an observation object side to an eye point side:
   a first lens having a positive refractive power;
   a second lens having a negative refractive power;
   a third lens having a positive refractive power; and
   a fourth lens having a positive refractive power,
   wherein the first lens, the second lens, the third lens, and the fourth lens are all single lenses,
   the second lens has a biconcave shape,
   an observation object side surface of the fourth lens has a convex shape,
   in a case where a refractive index of the third lens with respect to a d line is N3,
   a conditional expression (1) is satisfied $$1.76 < N3 < 2 \tag{1},$$

in a case where a focal length of the second lens is f2, and a focal length of the fourth lens is f4,
   a conditional expression (2a) is satisfied $$-0.300 \leq f2/f4 < -0.2 \tag{2a},$$

and
   in a case where a radius of curvature of an eye point side surface of the second lens is R2r, and
   a radius of curvature of an observation object side surface of the third lens is R3f,
   a conditional expression (5) is satisfied $$-2.1 < (R2r + R3f)/(R2r - R3f) < -0.2 \tag{5}.$$

2. The eyepiece lens according to claim 1,
   wherein, in a case where a focal length of the eyepiece lens is f, and
   a focal length of the first lens is f1,
   a conditional expression (3) is satisfied $$1.2 < f/f1 < 3.5 \tag{3}.$$

3. The eyepiece lens according to claim 1,
   wherein, in a case where a focal length of the first lens is f1, and
   the focal length of the fourth lens is f4,
   a conditional expression (4) is satisfied $$2.7 < f4/f1 < 8 \tag{4}.$$

4. The eyepiece lens according to claim 1,
   wherein the first lens has a biconvex shape.

5. The eyepiece lens according to claim 1,
   wherein an eye point side surface of the third lens has a convex shape.

6. The eyepiece lens according to claim 1,
   wherein the observation object side surface of the fourth lens has an aspheric surface.

7. The eyepiece lens according to claim 1,
   wherein an eye point side surface of the second lens has an aspheric surface.

8. The eyepiece lens according to claim 1,
   wherein diopter adjustment is performed by changing a distance between an observation object and the eyepiece lens in a direction of an optical axis.

9. The eyepiece lens according to claim 1,
   wherein a conditional expression (1-1) is satisfied $1.8 < N3 < 1.9$  (1-1).

10. The eyepiece lens according to claim 1, wherein a conditional expression (2-1a) is satisfied $-0.300 \leq f2/f4 < -0.21$  (2-1a).

11. The eyepiece lens according to claim 2, wherein a conditional expression (3-1) is satisfied $1.4 \leq f/f1 < 2.5$  (3-1).

12. The eyepiece lens according to claim 3, wherein a conditional expression (4-1) is satisfied $3 < f4/f1 < 5$  (4-1).

13. The eyepiece lens according to claim 1, wherein a conditional expression (5-1) is satisfied $-1.75 < (R2r + R3f)/(R2r - R3f) < -0.6$  (5-1).

14. An observation optical system comprising:
a display element; and
the eyepiece lens according to claim 1,
wherein the observation optical system allows observation of an image of the display element through the eyepiece lens, and
during diopter adjustment, the eyepiece lens remains stationary, and the display element is moved by changing a distance between the display element and the eyepiece lens in a direction of an optical axis.

15. An optical apparatus comprising:
the eyepiece lens according to claim 1.

16. An optical apparatus comprising:
the observation optical system according to claim 14.

\* \* \* \* \*